US012602171B2

(12) United States Patent
Lee et al.

(10) Patent No.: US 12,602,171 B2
(45) Date of Patent: Apr. 14, 2026

(54) STORAGE DEVICE AND METHOD WITH FLEXIBLE POWER LOSS PROTECTION

(71) Applicant: Samsung Electronics Co., Ltd., Suwon-si (KR)

(72) Inventors: Jooeun Lee, Suwon-si (KR); Jeayoung Kwon, Suwon-si (KR); Jaesub Kim, Suwon-si (KR); Yangwoo Roh, Suwon-si (KR); Kyungho Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/764,491

(22) Filed: Jul. 5, 2024

(65) Prior Publication Data

US 2025/0165157 A1 May 22, 2025

(30) Foreign Application Priority Data

Nov. 21, 2023 (KR) ........................ 10-2023-0162716

(51) Int. Cl.
*G06F 3/06* (2006.01)
*G06F 1/30* (2006.01)
(52) U.S. Cl.
CPC .............. *G06F 3/0619* (2013.01); *G06F 1/30* (2013.01); *G06F 3/0631* (2013.01); *G06F 3/0656* (2013.01); *G06F 3/0673* (2013.01)
(58) Field of Classification Search
CPC .... G06F 3/0619; G06F 3/0631; G06F 3/0656; G06F 3/0673; G06F 1/30
USPC ........................................................ 711/154
See application file for complete search history.

(56) References Cited

U.S. PATENT DOCUMENTS

| | | | |
|---|---|---|---|
| 7,679,133 B2 | 3/2010 | Son et al. | |
| 8,553,466 B2 | 10/2013 | Han et al. | |
| 8,559,235 B2 | 10/2013 | Yoon et al. | |
| 8,654,587 B2 | 2/2014 | Yoon et al. | |
| 11,218,019 B2 | 1/2022 | Suljic et al. | |
| 11,347,593 B2 | 5/2022 | Horspool et al. | |
| 11,656,257 B2 | 5/2023 | Butler et al. | |
| 11,656,990 B2 | 5/2023 | Jeon et al. | |
| 11,677,259 B2 | 6/2023 | Suljic et al. | |
| 11,734,110 B1 * | 8/2023 | Rijo ................... | G06F 11/1068 |
| | | | 714/764 |

(Continued)

OTHER PUBLICATIONS

Extended European Search Report dated Jan. 29, 2025 issued in European Patent Application No. 24192056.0-1218.

*Primary Examiner* — Than Nguyen
(74) *Attorney, Agent, or Firm* — Fish & Richardson P.C.

(57) ABSTRACT

A storage device includes a multi-function controller configured to control a plurality of functions requested from a host, a power loss protection (PLP) capacitor configured to supply auxiliary power to the storage device, and a PLP controller configured to periodically monitor a status of the PLP capacitor and manage a performance list including pieces of performance information supportable for the plurality of functions according to the status of the PLP capacitor. The PLP controller is further configured to provide the performance list to the host in response to a first command received from the host, and set a performance level for at least one function from among the plurality of functions by adjusting internal resources of the storage device, in response to a second command received from the host.

20 Claims, 22 Drawing Sheets

<u>10</u>

(56) References Cited

U.S. PATENT DOCUMENTS

| | | | | |
|---|---|---|---|---|
| 2011/0233648 | A1 | 9/2011 | Seol et al. | |
| 2018/0059761 | A1 | 3/2018 | An et al. | |
| 2020/0379645 | A1 | 12/2020 | Kazi et al. | |
| 2022/0179786 | A1* | 6/2022 | Jin | G06F 12/0684 |
| 2022/0197833 | A1* | 6/2022 | Steinmetz | G06F 13/1668 |
| 2023/0091384 | A1 | 3/2023 | Tan | |
| 2023/0289087 | A1* | 9/2023 | Aiouaz | G06F 3/0653 |

* cited by examiner

Figure 1:
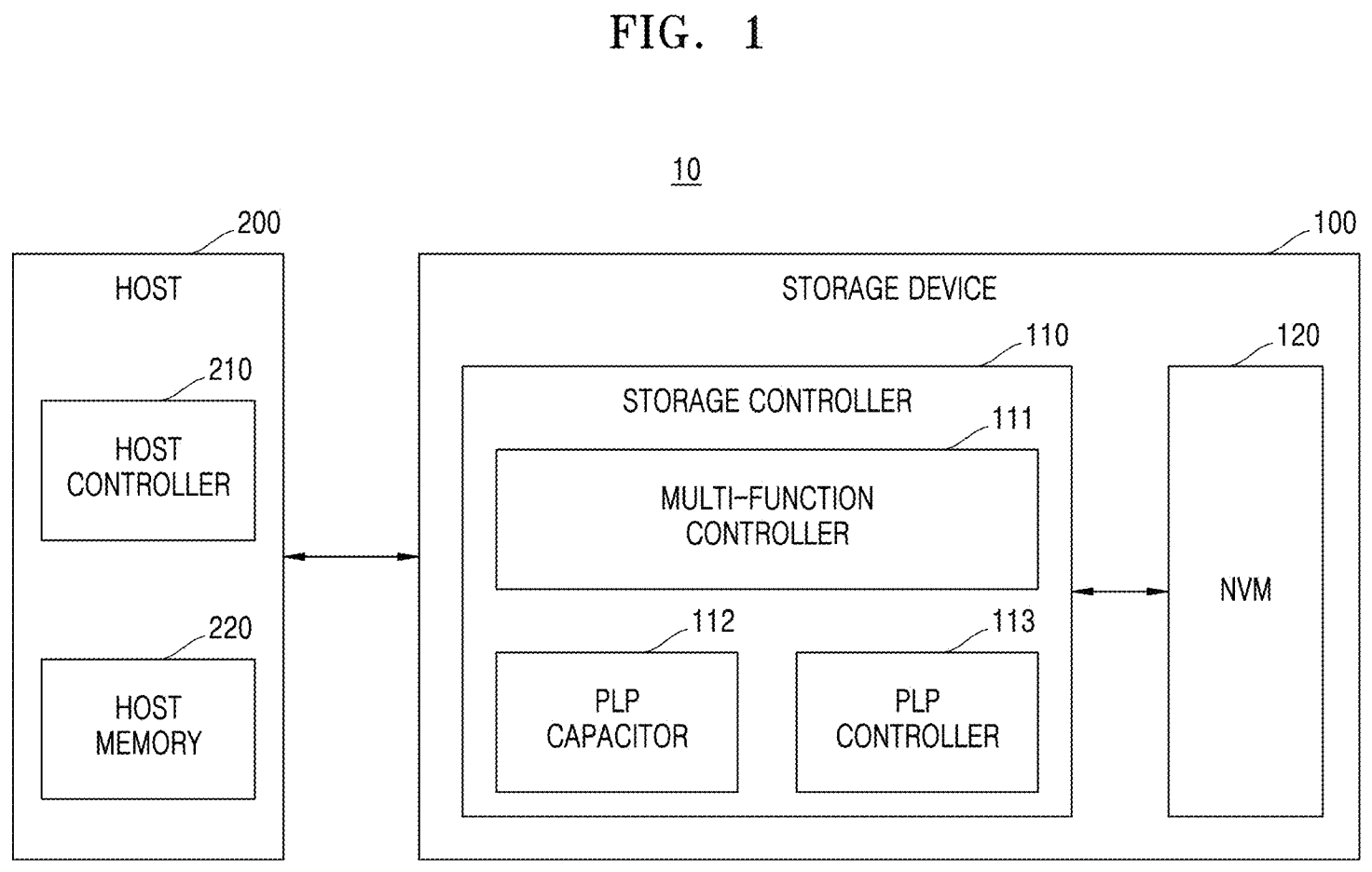

STORAGE DEVICE 100

STORAGE CONTROLLER 110

MULTI-FUNCTION CONTROLLER 111

PLP CAPACITOR 112

PLP CONTROLLER 113

NVM 120

HOST 200

HOST CONTROLLER 210

HOST MEMORY 220

| CAP_STATUS BASED PLP DATA SIZE | PERFORMANCE | |
|---|---|---|
| S0<br>(More than best) | PI_0<br>(Maximum performance + 10%) | OVER-HEALTHY |
| S1<br>(More than best) | PI_1<br>(Maximum performance + 5%) | |
| S2<br>(Best) | PI_2<br>(Maximum performance) | |
| S3<br>(Well) | PI_3<br>(Maximum performance − 5%) | UNHEALTHY |
| S4<br>(Good) | PI_4<br>(Maximum performance − 10%) | |
| . . . | . . . | |
| S10<br>(Bad) | PI_10<br>(Maximum performance − X%) | |

| CRITERIA INDEX | CRITERIA VALID BIT | CAP_STATUS BASED PLP DATA SIZE | PERFORMANCE |
|---|---|---|---|
| 0 | 1 | S0 (More than best) | PL_0 (Maximum performance + 10%) |
| 1 | 1 | S1 (More than best) | PL_1 (Maximum performance + 5%) |
| 2 | 1 | S2 (Best) | PL_2 (Maximum performance) |
| 3 | 1 | S3 (Well) | PL_3 (Maximum performance − 5%) |
| 4 | 1 | S4 (Good) | PL_4 (Maximum performance − 10%) |
| ⋮ | ⋮ | ⋮ | ⋮ |
| 10 | 1 | S10 (Bad) | PL_10 (Maximum performance − X%) |

OVER-HEALTHY

UNHEALTHY

| CRITERIA INDEX | CRITERIA VALID BIT | CAP_STATUS BASED PLP DATA SIZE | PERFORMANCE |
|---|---|---|---|
| 0 | 0 | S0 (More than best) | PL_0 (Maximum performance + 10%) |
| 1 | 0 | S1 (More than best) | PL_1 (Maximum performance + 5%) |
| 2 | 1 | S2 (Best) | PL_2 (Maximum performance) |
| 3 | 1 | S3 (Well) | PL_3 (Maximum performance − 5%) |
| 4 | 1 | S4 (Good) | PL_4 (Maximum performance − 10%) |
| ⋮ | ⋮ | ⋮ | ⋮ |
| 10 | 1 | S10 (Bad) | PL_10 (Maximum performance − X%) |

FIG. 10

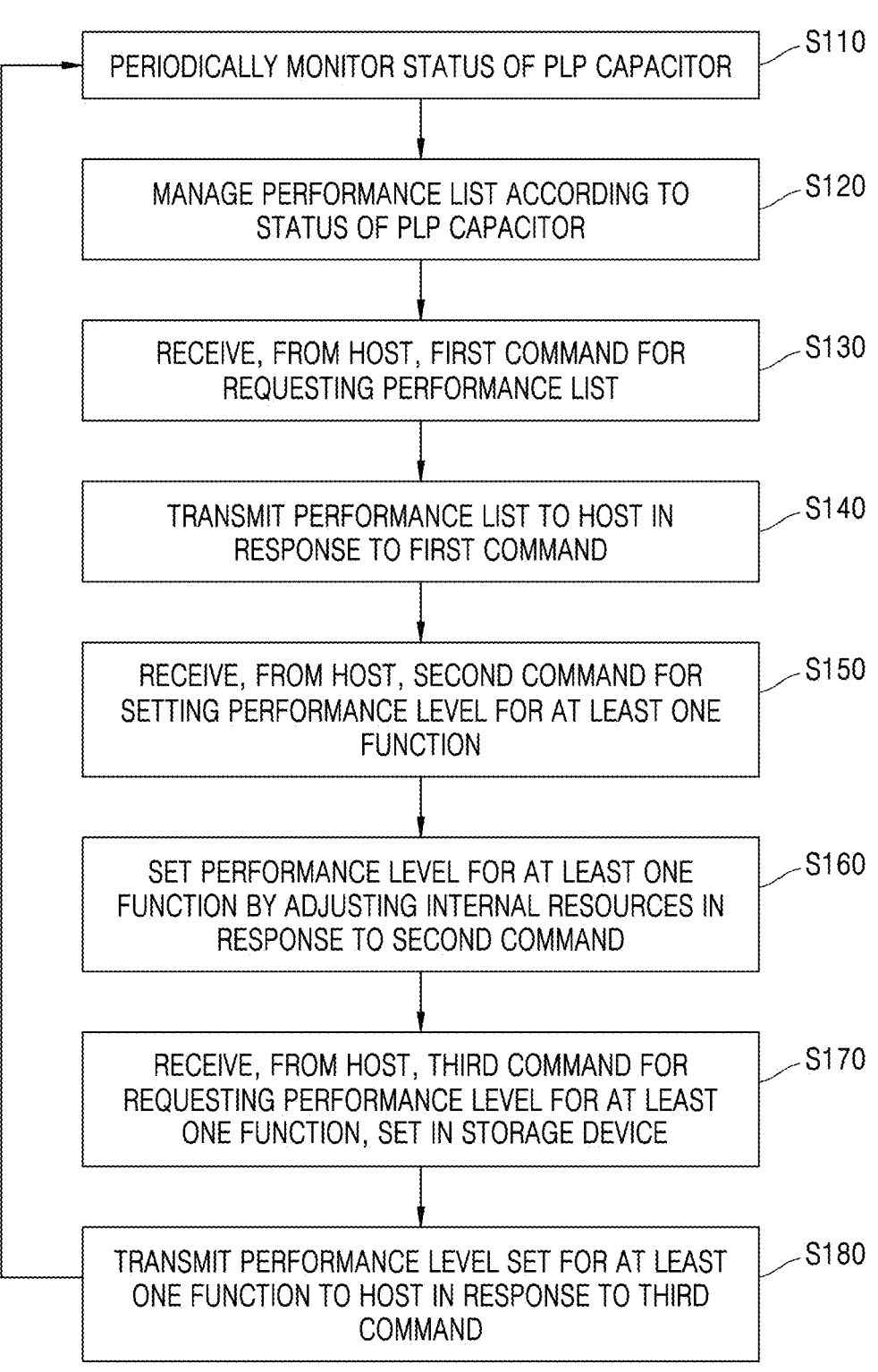

S110 — PERIODICALLY MONITOR STATUS OF PLP CAPACITOR

S120 — MANAGE PERFORMANCE LIST ACCORDING TO STATUS OF PLP CAPACITOR

S130 — RECEIVE, FROM HOST, FIRST COMMAND FOR REQUESTING PERFORMANCE LIST

S140 — TRANSMIT PERFORMANCE LIST TO HOST IN RESPONSE TO FIRST COMMAND

S150 — RECEIVE, FROM HOST, SECOND COMMAND FOR SETTING PERFORMANCE LEVEL FOR AT LEAST ONE FUNCTION

S160 — SET PERFORMANCE LEVEL FOR AT LEAST ONE FUNCTION BY ADJUSTING INTERNAL RESOURCES IN RESPONSE TO SECOND COMMAND

S170 — RECEIVE, FROM HOST, THIRD COMMAND FOR REQUESTING PERFORMANCE LEVEL FOR AT LEAST ONE FUNCTION, SET IN STORAGE DEVICE

S180 — TRANSMIT PERFORMANCE LEVEL SET FOR AT LEAST ONE FUNCTION TO HOST IN RESPONSE TO THIRD COMMAND

FIG. 12

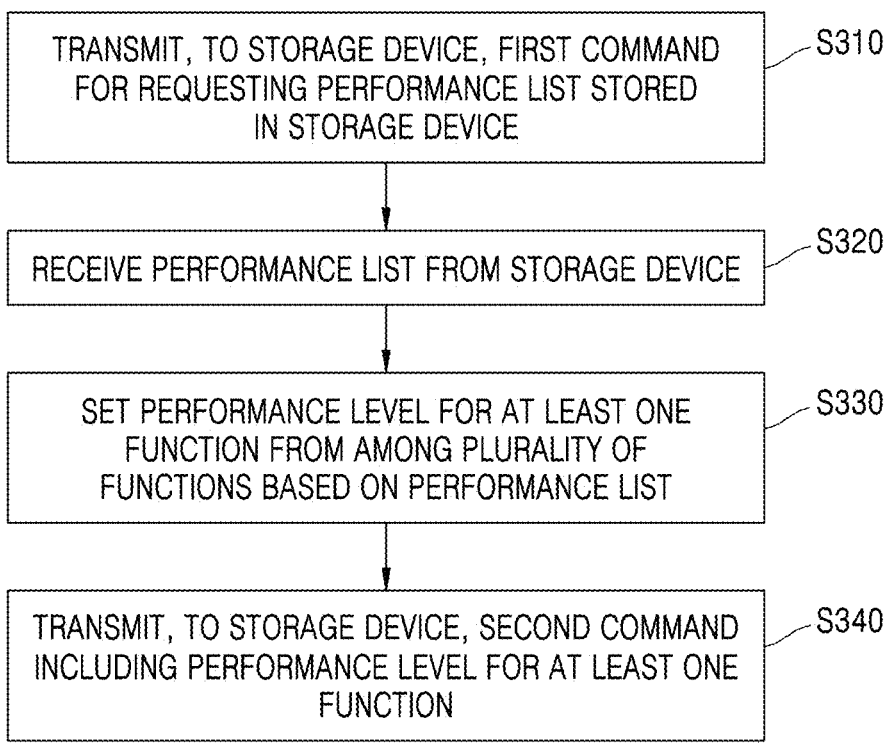

TRANSMIT, TO STORAGE DEVICE, FIRST COMMAND
FOR REQUESTING PERFORMANCE LIST STORED
IN STORAGE DEVICE     S310

RECEIVE PERFORMANCE LIST FROM STORAGE DEVICE     S320

SET PERFORMANCE LEVEL FOR AT LEAST ONE
FUNCTION FROM AMONG PLURALITY OF
FUNCTIONS BASED ON PERFORMANCE LIST     S330

TRANSMIT, TO STORAGE DEVICE, SECOND COMMAND
INCLUDING PERFORMANCE LEVEL FOR AT LEAST ONE
FUNCTION     S340

STORAGE DEVICE AND METHOD WITH FLEXIBLE POWER LOSS PROTECTION

CROSS-REFERENCE TO RELATED APPLICATION

This application is based on and claims priority under 35 U.S.C. § 119 to Korean Patent Application No. 10-2023-0162716, filed on Nov. 21, 2023, in the Korean Intellectual Property Office, the disclosure of which are incorporated by reference herein in its entirety.

BACKGROUND

The inventive concepts relate to memory devices, and more particularly, to storage devices, operating methods of such storage devices, and/or operating methods of hosts connected to such storage devices.

In general, a storage device including a nonvolatile memory and a controller operates by receiving power from the outside. Sudden power-off (SPO) in which power is suddenly cut off may occur while the storage device is operating. In this case, because the controller buffers data by using a volatile memory, the data buffered in the volatile memory may be lost or an erase operation or a write operation being performed in the nonvolatile memory may not be completed. To solve this problem, the storage device completes the operation being performed by using an auxiliary power supply device including a capacitor and backs up the data in the nonvolatile memory.

SUMMARY

The inventive concepts provide storage devices, an operating method of such storage devices, and/or operating methods of hosts supporting flexible power loss protection (PLP) by dynamically adjusting performance levels for a plurality of functions according to a capacitor status.

According to an example embodiment of the inventive concepts, a storage device may include a multi-function controller configured to control a plurality of functions requested from a host, a power loss protection (PLP) capacitor configured to supply auxiliary power to the storage device, and a PLP controller configured to periodically monitor a status of the PLP capacitor and manage a performance list including pieces of performance information supportable for the plurality of functions according to the status of the PLP capacitor, wherein the PLP controller is further configured to provide the performance list to the host in response to a first command received from the host, and set a performance level for at least one function from among the plurality of functions by adjusting internal resources of the storage device, in response to a second command received from the host.

According to an example embodiment of the inventive concepts, an operating method of a storage device may include periodically monitoring a status of a power loss protection (PLP) capacitor included in the storage device, managing a performance list including pieces of performance information supportable for a plurality of functions according to the status of the PLP capacitor, receiving, from a host, a first command for requesting the performance list, transmitting the performance list to the host in response to the first command, receiving, from the host, a second command for setting a performance level for at least one function from among the plurality of functions, and setting the performance level for the at least one function by adjusting internal resources of the storage device, in response to the second command.

According to an example embodiment of the inventive concepts, an operating method of a host may include transmitting, to a storage device, a first command for requesting a performance list including pieces of performance information supportable for a plurality of functions, receiving the performance list from the storage device, setting a performance level for at least one function from among the plurality of functions, based on the performance list, and transmitting, to the storage device, a second command including the performance level for the at least one function.

BRIEF DESCRIPTION OF THE DRAWINGS

Example Embodiments will be more clearly understood from the following detailed description taken in conjunction with the accompanying drawings in which:

FIG. 1 is a block diagram illustrating a storage system, according to an example embodiment;

FIG. 2 is a block diagram illustrating a storage controller, according to an example embodiment;

FIG. 4A illustrates a performance list, according to an example embodiment; FIG. 4B illustrates an updated performance list, according to an example embodiment;

FIGS. 9 to 11 are flowcharts illustrating an operating method of a storage device, according to some example embodiments;

FIGS. 12 to 14 are flowcharts illustrating an operating method of a host, according to some example embodiments;

DETAILED DESCRIPTION

Figure 3:
FIG. 3 illustrates an internal table showing a status of a power loss protection (PLP) capacitor, according to an example embodiment.

Hereinafter, some example embodiments will be described in detail with reference to the accompanying drawings. In the drawings, the same elements are denoted by the same reference numerals, and a repeated description thereof will be omitted.

As used herein, expressions such as "at least one of," when preceding a list of elements, modify the entire list of elements and do not modify the individual elements of the list. Thus, for example, both "at least one of A, B, or C" and "at least one of A, B, and C" mean either A, B, C or any combination thereof. Likewise, A and/or B means A, B, or A and B.

FIG. 1 is a block diagram illustrating a storage system 10, according to an example embodiment.

Referring to FIG. 1, the storage system 10 may include a storage device 100 and a host 200, and thus, the storage system 10 may be referred to as a host-storage system. The storage device 100 may include a storage controller 110 and a nonvolatile memory (NVM) 120. According to an example embodiment, the storage controller 110 may be referred to as a controller, a memory controller, or an NVM controller.

In an example embodiment, a plurality of commands may be generated according to requests generated by a plurality of users of the host 200, and the generated plurality of commands may be transmitted to the storage device 100. The storage device 100 may provide a plurality of responses corresponding to the plurality of commands to the plurality of users, respectively. For example, the host 200 may generate a plurality of virtual machines based on virtualization and may assign the plurality of virtual machines to the plurality of users. In an example, any one virtual machine may be assigned to a corresponding one of the plurality of users, and each of the plurality of users may provide a command to the storage device 100 through the assigned virtual machine. As such, the plurality of users may share the storage device 100.

Recently, a multi-host storage system in which a single storage medium supports a plurality of hosts or a plurality of tenants such as a plurality of virtual machines has been developed. For example, multi-function technology in which a single storage medium may operate with a plurality of devices has been developed. Multi-function technology may include technology that provides a plurality of physical functions and single root input output virtualization (SR-IOV) technology that provides a plurality of physical functions and a plurality of virtual functions by implementing a plurality of virtual functions with one physical function. When SR-IOV technology provides the same number of functions, it may reduce implementation costs compared to a plurality of physical functions.

In the present example embodiment, the storage controller 110 may include a multi-function controller 111, a power loss protection (PLP) capacitor 112, and a PLP controller 113. The multi-function controller 111 may generally control an operation of the storage controller 110 and may be implemented as, for example, a controller chip. In an example embodiment, the multi-function controller 111 may control a plurality of functions requested from the host 200. For example, the plurality of functions may include at least one physical function and/or at least one virtual function, which will be described in more detail with reference to FIG. 8.

The PLP capacitor 112 may supply auxiliary power to the storage device 100. When sudden power-off (SPO) occurs in the storage system 10, the PLP capacitor 112 may supply auxiliary power to the storage device 100 and thus, may store write data received from the host 200 in the NVM 120. For example, the PLP capacitor 112 may include a plurality of capacitors. Although the storage controller 110 includes the PLP capacitor 112 in FIG. 1, the inventive concepts are not limited thereto. In some example embodiments, the PLP capacitor 112 may include at least one capacitor module including a plurality of capacitors and may be located outside the storage controller 110.

The PLP controller 113 may periodically monitor a status of the PLP capacitor 112 and may manage a performance list including pieces of performance information supportable for the plurality of functions according to a monitoring result, that is, the status of the PLP capacitor 112. The storage device 100 may transmit the performance list to the host 200, and the host 200 may dynamically determine performance criteria or performance levels corresponding to the plurality of functions, respectively, according to the status of the PLP capacitor 112 based on the performance list. The PLP controller 113 may set a performance level for each function by adjusting the internal resources of the storage device 100 according to the performance level for each function determined by the host 200.

For example, when first performance information corresponding to a first function from among the plurality of functions is equal to or greater than a reference value, the host 200 may increase a first performance level for the first function. In this case, the PLP controller 113 may increase internal resources corresponding to the first function according to the first performance level determined by the host 200. For example, when second performance information corresponding to a second function from among the plurality of functions is less than the reference value, the host 200 may reduce a second performance level for the second function. In this case, the PLP controller 113 may reduce internal resources corresponding to the second function according to the second performance level determined by the host 200.

The host 200 may transmit, to the storage device 100, a first command for requesting the performance list stored in the storage device 100. The storage device 100 may transmit the performance list to the host 200 in response to the first command received from the host 200. In this case, the performance list may include information about performance levels supportable by the storage device 100 according to a current status of the PLP capacitor 112.

The host 200 may set a performance level for at least one function from among the plurality of functions based on the performance list. For example, the host 200 may determine a performance level for each function by considering the priority or importance of the plurality of functions. For example, the host 200 may determine a performance level for each function according to characteristics of tenants or users corresponding to the plurality of functions, respectively. In this case, the host 200 may determine a performance level for each function so that a sum of performance levels for the plurality of functions does not exceed a level supportable by the storage device 100.

The host 200 may transmit a second command to the storage device 100 to set a performance level for at least one function in the storage device 100. The storage device 100 may set a performance level for at least one function by adjusting the internal resources of the storage device 100 in response to the second command. For example, the storage device 100 may set a data size or a write buffer size for at least one function by adjusting the internal resources.

The host 200 may transmit an event notification request, for example, an asynchronous event request (AER), to the storage device 100 in order to receive a notification according to a change in the status of the PLP capacitor 112. The storage device 100 may transmit, to the host 200, an event notification response, for example, an asynchronous event notice (AEN), according to the change in the status of the capacitor 112.

As such, the storage device 100 may update the performance list by periodically monitoring the status of the PLP capacitor 112, and may support flexible PLP by dynamically adjusting a plurality of levels for the plurality of functions according to settings of the host 200. Also, the host 200 may individually adjust performance levels for the plurality of functions, based on the updated performance list and the priority of the plurality of functions. Accordingly, the storage system 10 may guarantee or ensure data integrity in accordance with the current status of the PLP capacitor, thereby improving the reliability of the storage device 100.

The host 200 may include a host controller 210 and a host memory 220. The host controller 210 may manage an operation of storing data of a buffer area of the host memory 220 in the NVM 120 or storing data of the NVM 120 in the buffer area of the host memory 220. The host memory 220 may function as a buffer memory for temporarily storing write data to be transmitted to the storage device 100 or read data transmitted from the storage device 100. In an example, the host controller 210 may be any one of a plurality of modules provided in an application processor, and the application processor may be implemented as a system-on-chip (SoC). Also, the host memory 220 may be an embedded memory provided in the application processor, or may be an NVM or a memory module located outside the application processor.

In an example embodiment, the host 200 and the storage device 100 may communicate with each other based on a desired (or alternatively, pre-determined) interface. The desired (or alternatively, pre-determined) interface may support at least one of various interfaces such as, but not limited to, universal serial bus (USB), small computer system interface (SCSI), peripheral component interconnect (PCI) express, advanced technology attachment (ATA), parallel ATA (PATA), serial ATA (SATA), serial attached SCSI (SAS), universal flash storage (UFS), NVM express (NVMe), or compute express link (CXL).

The storage device 100 may include storage media for storing data according to a request from the host 200. For example, the storage device 100 may include at least one of a solid-state drive (SSD), an embedded memory, or a removable external memory. When the storage device 100 is an SSD, the storage device 100 may be a device following the NVMe standard. When the storage device 100 is an embedded memory or an external memory, the storage device 100 may be a device following the universal flash storage (UFS) or embedded multi-media card (eMMC) standard. Each of the host 200 and the storage device 100 may generate a packet according to an employed standard protocol and may transmit the packet.

When the NVM 120 of the storage device 100 includes a flash memory, the flash memory may include a two-dimensional (2D) NAND memory array or a three-dimensional (3D) vertical NAND (VNAND) memory array. In another example, the storage device 100 may include various other types of NVMs. For example, the storage device 100 may include any of a magnetic random-access memory (MRAM), a spin-transfer torque MRAM, a conductive bridging RAM (CBRAM), a ferroelectric RAM (FeRAM), a phase RAM (PRAM), a resistive RAM, and various other types of memories. According to some example embodiments, the NVM 120 may include a plurality of memory chips, a plurality of memory dies, or a plurality of memory planes.

Figure 2:
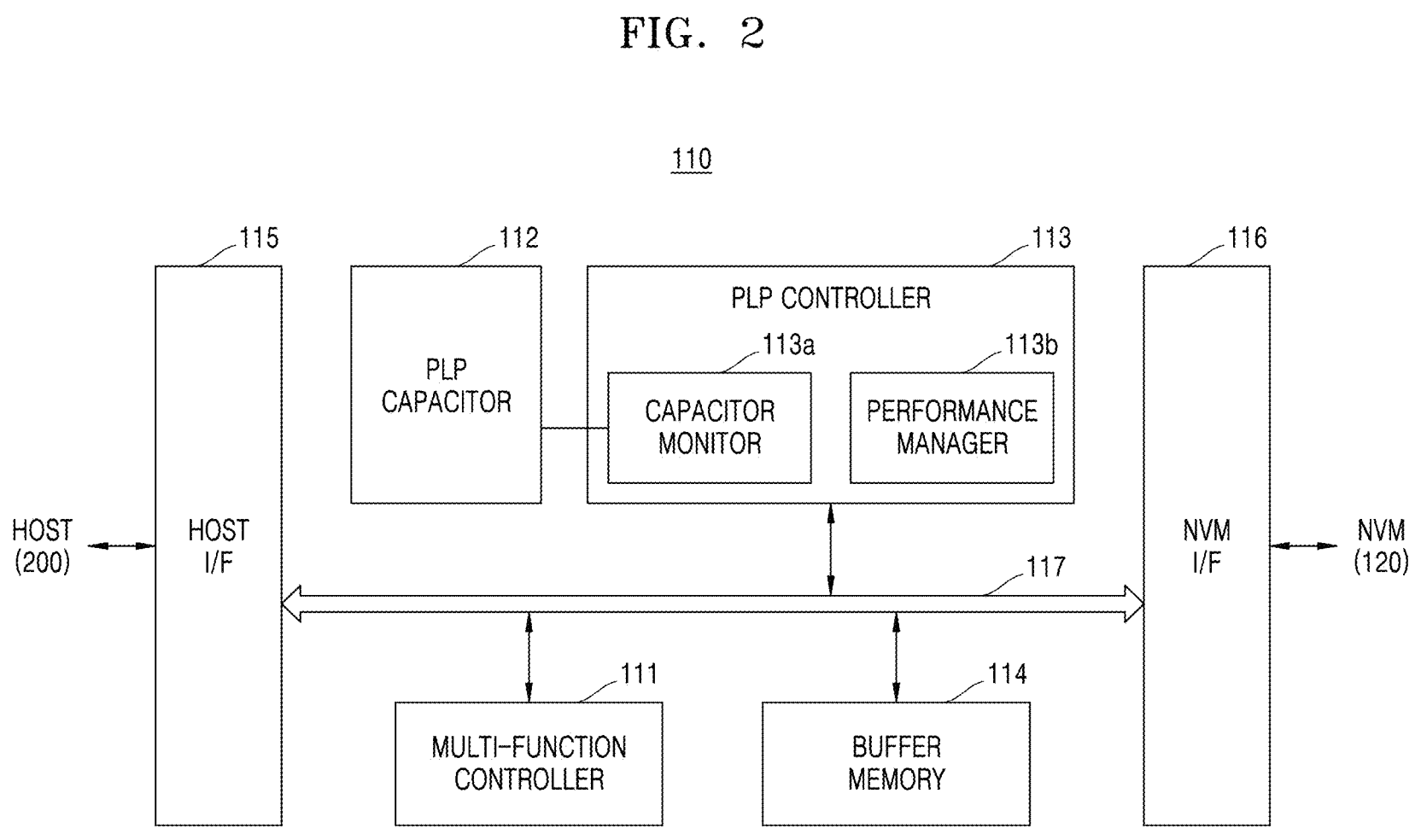

FIG. 2 is a block diagram illustrating the storage controller 110, according to an example embodiment.

Referring to FIG. 2, the storage controller 110 may include the multi-function controller 111, the PLP capacitor 112, the PLP controller 113, a buffer memory 114, a host interface (I/F) 115, and an NVM I/F 116. The multi-function controller 111, the PLP capacitor 112, the PLP controller 113, the buffer memory 114, the host I/F 115, and the NVM I/F 116 may communicate with each other via a bus 117. Hereinafter, elements of the storage controller 110 will be described in detail.

The multi-function controller 111 may control a plurality of functions requested from the host 200. The multi-function controller 111 may include, for example, a central processing unit (CPU) or a microprocessor and may control an overall operation of the storage controller 110. For example, the multi-function controller 111 may be implemented as a multi-core processor such as a dual-core processor or a quad-core processor.

The PLP controller 113 may periodically monitor a status of the PLP capacitor 112 and may manage a performance list including pieces of performance information corresponding to the plurality of functions, respectively, according to a monitoring result, that is, the status of the PLP capacitor 112. In this case, the performance list may include a data size and/or a write buffer size that may be guaranteed or allowed by PLP for each function. The PLP controller 113 may include a capacitor monitor 113a and a performance manager 113b.

When power is supplied to the storage controller 110, the capacitor monitor 113a may periodically monitor the status of the PLP capacitor 112. For example, the capacitor monitor 113a may periodically monitor the total capacitance of the PLP capacitor 112. For example, the capacitor monitor 113a may be implemented as a hardware module that performs a capacitor health monitoring (CHM) function. However, the inventive concepts are not limited thereto, and the capacitor monitor 113a may be implemented by using software and/or firmware.

The performance manager 113b may manage the performance list including the pieces of performance information corresponding to the plurality of functions according to the status of the PLP capacitor 112. In this case, the performance manager 113b may manage the performance list so that a sum of the pieces of performance information corresponding to the plurality of functions is equal to or less than a range supportable by the storage device 100. The performance manager 113b may divide the status of the PLP capacitor 112 into an over-healthy status, an unhealthy status, and an unguaranteed status. For example, the performance manager 113b may be implemented as software. However, the inventive concepts are not limited thereto, and the performance manager 113b may be implemented by using hardware and/or firmware. An operation of the capacitor monitor 113a and an operation of the performance manager 113b will be described in more detail with reference to FIGS. 3 to 7B.

The buffer memory 114 may temporarily store write data to be written to the NVM 120 or read data to be read from the NVM 120. According to the present example embodiment, a write buffer size for each function may be dynamically adjusted according to the status of the PLP capacitor 112. For example, when the status of the PLP capacitor 112 is equal to or greater than a reference value, the write buffer size may increase, and when the status of the PLP capacitor 112 is less than the reference value, the write buffer size may decrease. The buffer memory 114 may be an element provided in the storage controller 110, or may be located outside the storage controller 110. For example, the storage controller 110 may further include a buffer memory manager (not shown) or a buffer memory interface (not shown) for communicating with the buffer memory 114.

The host I/F 115 may transmit and receive a packet to and from the host 200. The packet transmitted from the host 200 to the host I/F 115 may include a command or write data or the like to be written to the NVM 120, and the packet transmitted from the host I/F 115 to the host 200 may include a response to the command or read data read from the NVM 120. The NVM I/F 116 may transmit write data to be written to the NVM 120 or may receive read data read from the NVM 120. The NVM I/F 116 may be implemented to comply with a standard protocol such as toggle or open NAND flash interface (ONFI).

In an example embodiment, the host I/F 115 may receive, from the host 200, a first command for requesting the performance list (e.g., a get log page command) and may transmit the performance list to the host 200 in response to the first command. In an example embodiment, the host I/F 115 may receive, from the host 200, a second command for setting a performance level for each function (e.g., a set features command) and may transmit a response message to the host 200 in response to the second command. In an example embodiment, the host I/F 115 may receive, from the host 200, a third command for requesting the set performance level (e.g., a get features command) and may transmit a response to the performance level for each function to the host 200 in response to the third command, as described below in detail with reference to FIGS. 15 and 16.

In an example embodiment, the host I/F 115 may receive an event notification request, for example, an AER, from the host 200, and may transmit an event notification response, for example, an AEN, according to a change in the status of the PLP capacitor 112 in response to the event notification request, as described below in detail with reference to FIG. 15.

FIG. 3 illustrates an internal table IT showing a status of a PLP capacitor, according to an example embodiment.

Referring to FIGS. 2 and 3 together, the capacitor monitor 113a may monitor a status of the PLP capacitor 112 based on, for example, the total capacitance of the PLP capacitor 112. The performance manager 113b may manage the internal table IT showing a relationship between a PLP data size and performance information according to the status of the PLP capacitor 112. The PLP data size may correspond to a data size that may be guaranteed or allowed by PLP. When sudden power-off (SPO) occurs, write data corresponding to the PLP data size may be flushed from the buffer memory 114 to the NVM 120.

The internal table IT may divide the PLP data size based on the status of the PLP capacitor 112 into S0 to S10 and may divide the performance information corresponding to the PLP data size into PI_0 to PI_10. For example, when the total capacitance of the PLP capacitor 112 corresponds to a reference capacitance, the status of the PLP capacitor 112 may correspond to a reference status. In this case, the PLP data size may be S2, and the performance information may correspond to PI_2 guaranteeing or enabling maximum performance. In an example embodiment, the maximum performance may vary according to functions. However, the inventive concepts are not limited thereto, and in some example embodiments, the maximum performance may be the same for a plurality of functions.

For example, when the total capacitance of the PLP capacitor 112 is higher than the reference capacitance, the status of the PLP capacitor 112 may correspond to an over-healthy status. In this case, the PLP data size may be S0 or S1, and the performance information may correspond to PI_0, which guarantees or allows performance 10% higher than the maximum performance, or PI_1, which guarantees or allows performance 5% higher than the maximum performance.

For example, when the total capacitance of the PLP capacitor 112 is lower than the reference capacitance, the status of the PLP capacitor 112 may correspond to an unhealthy status. In this case, the PLP data size may be S3 or S4, and the performance information may correspond to PI_3, which guarantees or allows performance 5% lower than the maximum performance, or PI_4, which guarantees or allows performance 10% lower than the maximum performance. For example, when the total capacitance of the PLP capacitor 112 is much lower than the reference capacitance, the PLP data size may be S10, and the performance information may correspond to PI_10, which guarantees or allows performance X % lower than the maximum performance (where X>10).

FIG. 4A illustrates a performance list PL1, according to an example embodiment.

Referring to FIGS. 1 to 4A together, the performance list PL1 may include pieces of performance information supportable for a plurality of functions. For example, the performance manager 113b may assign a criteria index or an index to each of the plurality of functions. For example, the performance manager 113b may assign an index to each of a plurality of controllers. For example, the performance manager 113b may assign an index to each of a plurality of virtual functions or a plurality of physical functions.

The performance manager 113b may set a valid bit corresponding to each index based on a status of the PLP capacitor 112. In this case, the valid bit indicates whether a corresponding criteria index is valid. For example, when the storage device 100 may support a function corresponding to a criteria index, a valid bit may be set to 1, and when the storage device 100 may not support a function corresponding to a criteria index, a valid bit may be reset to 0. For example, the performance manager 113b may initially set a valid bit to 1, and may change the valid bit to 0 or may maintain the valid bit at 1 according to a change in the status of the PLP capacitor 112.

The performance manager 113b may manage a PLP data size and performance information for each function according to the status of the PLP capacitor 112. The performance manager 113b may determine the PLP data size for each function so that a sum of PLP data sizes corresponding to a plurality of indices, respectively, does not exceed a level supportable by the PLP capacitor 112. The performance manager 113b may determine the performance level for each function so that a sum of performance levels corresponding to a plurality of indices, respectively, does not exceed a level supportable by the PLP capacitor 112.

For example, the performance manager 113b may determine the PLP data size corresponding to index 0 as S0, and may determine the performance information as PI_0 guaranteeing or allowing performance 10% higher than maximum performance. For example, the performance manager 113b may determine the PLP data size corresponding to index 1 as S1, and may determine the performance information as PI_1 guaranteeing or allowing performance 5% higher than the maximum performance.

The host 200 may transmit, to the storage device 100, a first command for requesting the performance list PL1, for example, a get log page command. The storage device 100 may transmit the performance list PL1 to the host 200 in response to the first command. The host 200 may set a performance level for at least one function from among the plurality of functions based on the performance list PL1, and may transmit, to the storage device 100, a second command for setting a performance level for at least one function, for example, a set features command. The storage device 100 may set the performance level for the at least one function by adjusting internal resources in response to the second command. The storage device 100 may continue to periodically monitor the status of the PLP capacitor 112, and when the status of the PLP capacitor 112 changes, may update the performance list PL1.

FIG. 4B illustrates an updated performance list PL2, according to an example embodiment.

Referring to FIGS. 1 to 4B together, even after the performance list PL1 is generated, the capacitor monitor 113a may periodically monitor the status of the PLP capacitor 112, and the performance manager 113b may generate the updated performance list PL2 based on the changed status of the PLP capacitor 112. For example, when the total capacitance of the PLP capacitor 112 decreases, the performance manager 113b may reset a valid bit corresponding to index 0 and a valid bit corresponding to index 1 to 0.

When the status of the PLP capacitor 112 changes, the storage device 100 may transmit an event notification to the host 200. The host 200 may transmit, to the storage device 100, a first command including a request for the updated performance list PL2, for example, a get log page command. The storage device 100 may transmit the updated performance list PL2 to the host 200 in response to the first command.

The host 200 may reset a performance level for each function based on the updated performance list PL2. For example, the host 200 may reset a performance level of a function corresponding to index 0 or index 1. The host 200 may transmit, to the storage device 100, a command for resetting a performance level for each function, for example, a set features command. The storage device 100 may reset a performance level for each function by adjusting internal resources in response to the second command. For example, the storage device 100 may reset a performance level of a function corresponding to index 0 or index 1 in response to the second command.

Figure 5:
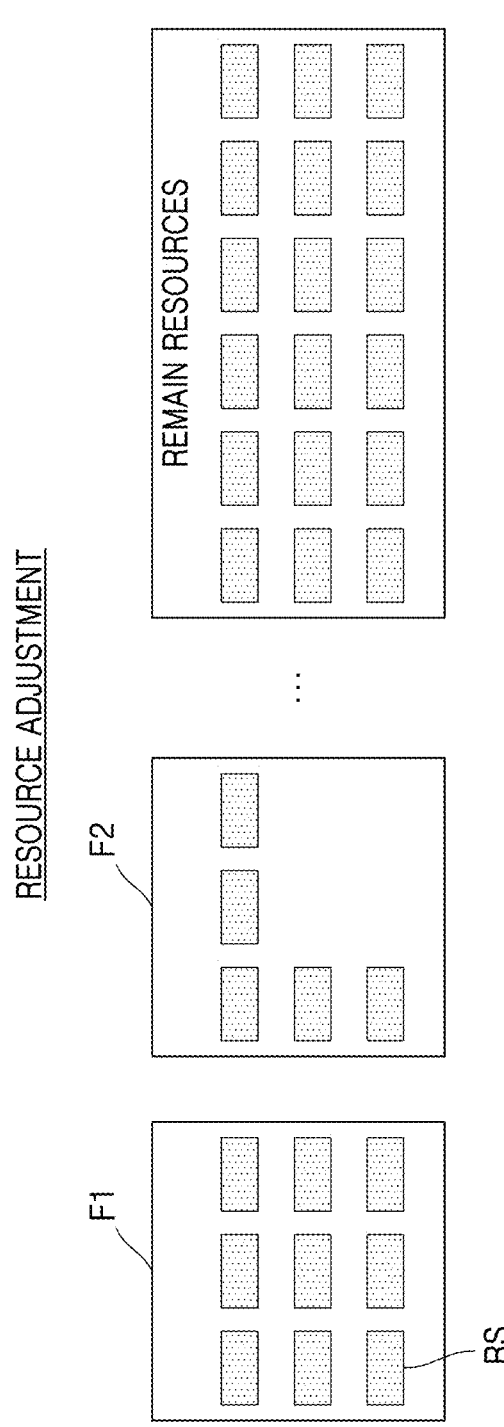
FIG. 5 is a diagram illustrating internal resource adjustment for each function, according to an example embodiment.

FIG. 5 is a diagram illustrating internal resource adjustment for each function, according to an example embodiment.

Referring to FIGS. 1 and 5 together, the storage device 100 may adjust internal resources RS for a plurality of functions according to settings of the host 200. For example, the host 200 may individually set performance levels of the plurality of functions according to the priority of the plurality of functions. The storage device 100 may assign the internal resources RS corresponding to the plurality of functions to correspond to performance levels individually set by the host 200. The internal resources RS may include a PLP data size and/or a flush cycle.

For example, the host 200 may set a performance level corresponding to a first function F1 to be higher than a performance level corresponding to a second function F2. In this case, the storage device 100 may assign more internal resources RS corresponding to the first function F1 than the internal resources RS corresponding to the second function F2. For example, a PLP data size corresponding to the first function F1 may be greater than a PLP data size corresponding to the second function F2. For example, a flush cycle corresponding to the first function F1 may be longer than a flush cycle corresponding to the second function F2. Also, the storage device 100 may assign the internal resources RS to the plurality of functions, respectively, and may manage the remaining internal resources RS as a spare.

Figure 6A:
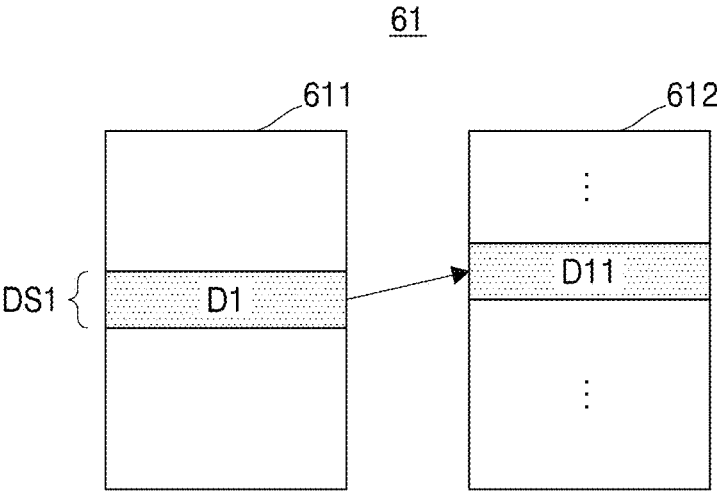
FIGS. 6A and 6B are diagrams illustrating methods of adjusting a PLP data size, according to an example embodiment.
Figure 6B:
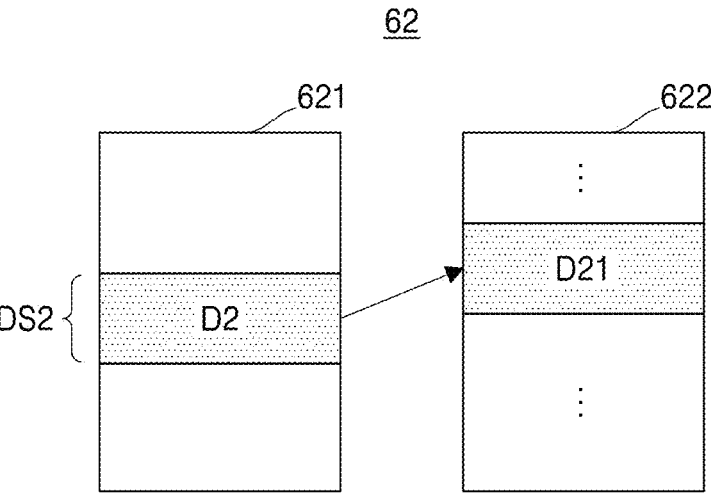

FIG. 6A is a diagram illustrating a method 61 of adjusting a PLP data size, according to an example embodiment. FIG. 6B is a diagram illustrating a method 62 of adjusting a PLP data size, according to an example embodiment.

Referring to FIGS. 1, 5, and 6A together, the host 200 may set a first performance level corresponding to a first function F1 based on a performance list (e.g., PL1 of FIG. 4A or PL2 of FIG. 4B), and the storage device 100 may set a PLP data size corresponding to the first function F1 to a first PLP data size DS1 according to the first performance level. Accordingly, buffered data D1 corresponding to the first data size DS1 may be flushed from a buffer memory 611 to an NVM 612 and thus, may be stored as write data D11 in the NVM 612. Accordingly, even when SPO occurs, the buffered data D1 corresponding to the first data size DS1 may be guaranteed or allowed by PLP.

Referring to FIGS. 1, 5, and 6B together, the host 200 may set a second performance level corresponding to a second function F2 based on a performance list (e.g., PL1 of FIG. 4A or PL2 of FIG. 4B), and the storage device 100 may set a PLP data size corresponding to the second function F2 to a second data size DS2 according to the second performance level. Accordingly, buffered data D2 corresponding to the second PLP data size DS2 may be flushed from a buffer memory 621 to an NVM 622 and thus, may be stored as write data D21 in the NVM 622. Accordingly, even when SPO occurs, the buffered data D2 corresponding to the second data size DS2 may be guaranteed or allowed by PLP.

Figure 7A:
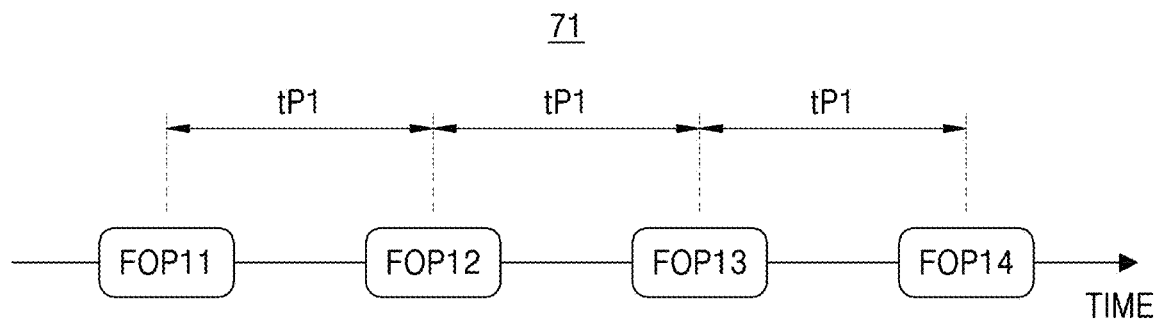
FIGS. 7A and 7B are diagrams illustrating methods of adjusting a flush cycle, according to an example embodiment.
Figure 7B:
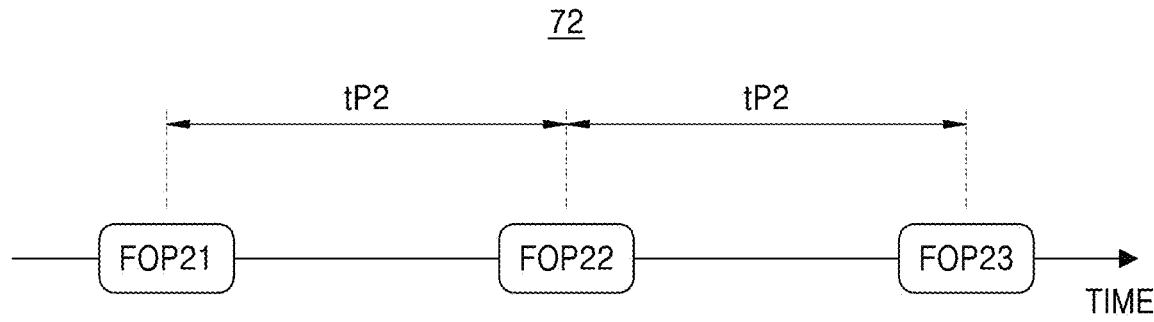

FIG. 7A is a diagram illustrating a method 71 of adjusting a flush cycle, according to an example embodiment. FIG. 7B is a diagram illustrating a method 72 of adjusting a flush cycle, according to an example embodiment.

Referring to FIGS. 1, 5, and 7A together, the host 200 may set a first performance level corresponding to a first function F1 based on a performance list (e.g., PL1 of FIG. 4A or PL2 of FIG. 4B), and the storage device 100 may set a flush cycle corresponding to the first function F1 to a first cycle tP1 according to the first performance level. Accordingly, data may be flushed from a buffer memory to an NVM according to the first cycle tP1. For example, first to fourth flush operations FOP11 to FOP14 may be sequentially performed according to the first cycle tP1.

Referring to FIGS. 1, 5, and 7B together, the host 200 may set a second performance level corresponding to a second function F2 based on a performance list (e.g., PL1 of FIG. 4A or PL2 of FIG. 4B), and the storage device 100 may set a flush cycle corresponding to the second function F2 to a second cycle tP2 according to the second performance level. Accordingly, data may be flushed from a buffer memory to an NVM according to the second cycle tP2. For example, first to third flush operations FOP21 to FOP23 may be sequentially performed according to the second cycle tP2.

Figure 8:
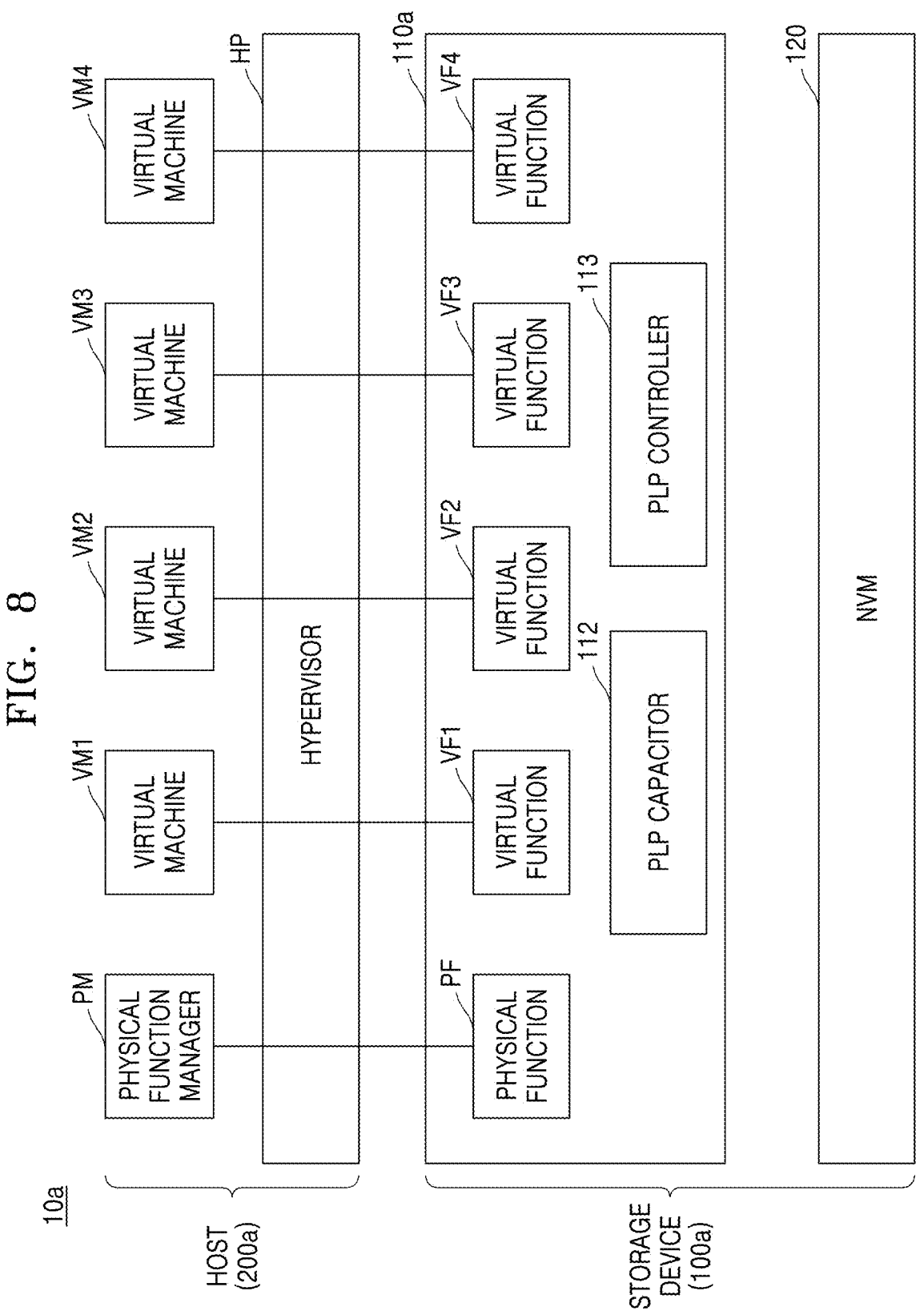
FIG. 8 is a block diagram illustrating a storage system, according to an example embodiment.

FIG. 8 is a block diagram illustrating a storage system 10a, according to an example embodiment.

Referring to FIG. 8, a host 200a may include a physical function manager PM, a hypervisor HP, and first to fourth virtual machines VM1 to VM4. A storage device 100a may include a storage controller 110a and the NVM 120. The storage controller 110a may include a physical function PF, first to fourth virtual functions VF1 to VF4, the PLP capacitor 112, and the PLP controller 113. For convenience of explanation, the same elements as those described with reference to FIG. 1 will not be described.

For example, the physical function PF and the first to fourth virtual functions VF1 to VF4 may be hardware, software, or a combination thereof configured to provide functions defined in a PCI-express interface standard. In some example embodiments, the physical function PF and the first to fourth virtual functions VF1 to VF4 may be PCI-express functions supporting SR-IOV. In some example embodiments, the physical function PF and the first to fourth virtual functions VF1 to VF4 may be sub-storage controllers. The sub-storage controllers may be implemented as software, hardware, or a combination thereof. For example, the physical function PF may be a primary controller, and the first to fourth virtual functions VF1 to VF4 may be secondary controllers.

For example, the host 200a may be configured to drive a plurality of virtual machines including the first to fourth virtual machines VM1 to VM4. Each of the first to fourth virtual machines VM1 to VM4 may be independently driven on the host 200a. For example, the first to fourth virtual machines VM1 to VM4 may correspond to respective ones of a plurality of users including first to fourth users or a plurality of tenants including first to fourth tenants. The hypervisor HP may be a logical platform configured to drive the first to fourth virtual machines VM1 to VM4 on the host 200a. Each of the first to fourth virtual machines VM1 to VM4 may be driven in the host 200a.

In an example embodiment, the physical function manager PM may communicate with the physical function PF, and the first to fourth virtual machines VM1 to VM4 may communicate with corresponding ones of the first to fourth virtual functions VF1 to VF4, respectively. In this case, the physical function manager PM may be a management host, and the first to fourth virtual machines VM1 to VM4 may be user hosts. For example, the physical function manager PM may transmit a management command to the physical function PF. Each of the first to fourth virtual machines VM1 to VM4 may transmit a general command to corresponding ones of the first to fourth virtual functions VF1 to VF4.

The physical function PF may receive the general command or the management command generated by the physical function manager PM and may process the general command or the management command. Each of the first to fourth virtual functions VF1 to VF4 may receive the general command generated by corresponding ones of the first to fourth virtual machines VM1 to VM4, and may process the general command. In this case, the first to fourth virtual functions VF1 to VF4 may share physical resources such as a link with the physical function PF and other virtual functions associated with the physical function PF. The first to fourth virtual functions VF1 to VF4 may be lightweight PCIe functions that may be directly accessed by the first to fourth virtual machines VM1 to VM4, respectively.

Each of the physical function manager PM and the first to fourth virtual machines VM1 to VM4 may be configured to access the storage device 100a. The first virtual machine VM1 may correspond to the first virtual function VF1, the second virtual machine VM2 may correspond to the second virtual function VF2, the third virtual machine VM3 may correspond to the third virtual function VF3, and the fourth virtual machine VM4 may correspond to the fourth virtual function VF4. In other words, the first virtual machine VM1 may communicate with the first virtual function VF1, the second virtual machine VM2 may communicate with the second virtual function VF2, the third virtual machine VM3 may communicate with the third virtual function VF3, and the fourth virtual machine VM4 may communicate with the fourth virtual function VF4.

In an example embodiment, a first user or a first tenant may access the storage device 100a through the first virtual machine VM1, and thus, the storage device 100a may process the first virtual function VF1 in response to a request of the host 200a. For example, the first user or the first tenant may dynamically select a desired performance level, for example, a first performance level, through the first virtual machine VM1, and the host 200a may dynamically adjust a performance level of the first virtual function VF1 to the first performance level. For example, the first user or the first tenant may dynamically select a desired reliability, for example, a first reliability, through the first virtual machine VM1, and the host 200a may dynamically adjust a reliability of the first virtual function VF1 to the first reliability.

Likewise, a second user or a second tenant may access the storage device 100a through the second virtual machine VM2, and thus, the storage device 100a may process the second virtual function VF2 in response to a request of the host 200a. For example, the second user or the second tenant may dynamically select a performance level, for example, a second performance level and/or a desired reliability, for example, a second reliability, through the second virtual machine VM2, and the host 200a may dynamically adjust a performance level of the second virtual function VF2 to the second performance level or may dynamically adjust a reliability of the second virtual function VF2 to the second reliability.

Likewise, a third user or a third tenant may access the storage device 100a through the third virtual machine VM3, and thus, the storage device 100a may process the third virtual function VF3 in response to a request of the host 200a. For example, the third user or the third tenant may dynamically select a desired performance level, for example, a third performance level, and/or a desired reliability, for example, a third reliability, through the third virtual machine VM3, and the host 200a may dynamically adjust a performance level of the third virtual function VF3 to the third performance level or may dynamically adjust a reliability of the third virtual function VF3 to the third reliability.

Likewise, a fourth user or a fourth tenant may access the storage device 100a through the fourth virtual machine VM4, and thus, the storage device 100a may process the fourth virtual function VF4 in response to a request of the host 200a. For example, the fourth user or the fourth tenant may dynamically select a desired performance level, for example, a fourth performance level, and/or a desired reliability, for example, a fourth reliability, through the fourth virtual machine VM4, and the host 200a may dynamically adjust a performance level of the fourth virtual function VF4 to the fourth performance level or may dynamically adjust a reliability of the fourth virtual function VF4 to the fourth reliability.

For example, the physical function PF may be a sub-storage controller corresponding to the physical function manager PM, and the first to fourth virtual functions VF1 to VF4 may be sub-storage controllers corresponding to the first to fourth virtual machines VM1 to VM4, respectively. However, the scope of the inventive concepts are not limited thereto. Also, for convenience of explanation, although the terms 'physical function' and 'virtual function' are used, the physical function and virtual function may be interchangeably used with the term 'sub-storage controller'. According to some example embodiments, the multi-function controller 111 of FIG. 1 may include the physical function PF and the first to fourth virtual functions VF1 to VF4.

In an example embodiment, the storage device 100a may support an SR-IOV function. SR-IOV may refer to a function in which one physical function supports one or more dependent virtual functions. The storage device 100a may include the first to fourth virtual functions VF1 to VF4 and may support multi-functions. For example, the physical function PF and the first to fourth virtual functions VF1 to VF4 may be configured to process a command of a corresponding host (e.g., virtual machine) or a command of a transmission queue managed by the corresponding host.

Figure 9:
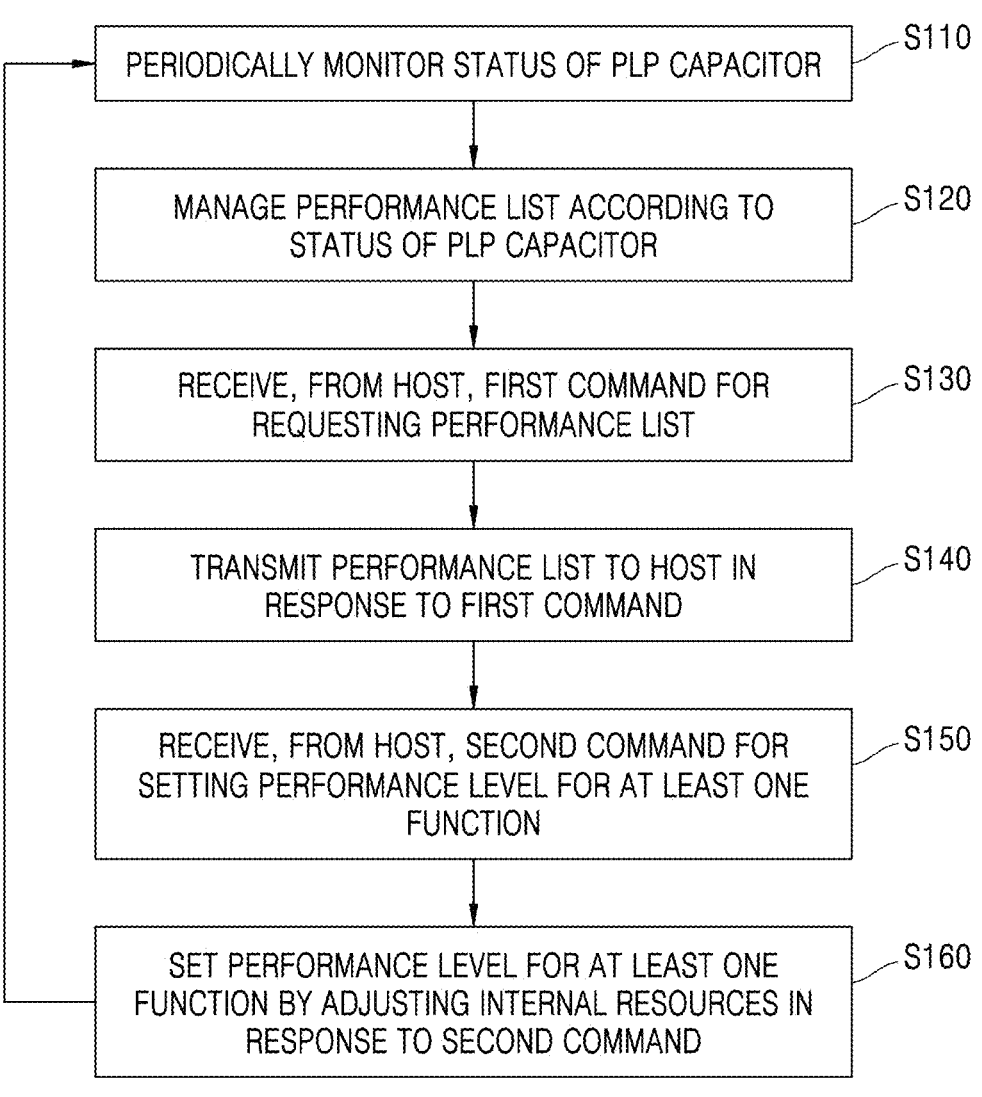

FIG. 9 is a flowchart illustrating an operating method of a storage device, according to an example embodiment.

Referring to FIG. 9, an operating method of a storage device, according to this example embodiment may correspond to a method by which a storage device for providing a plurality of functions sets a performance level for each of the plurality of functions according to settings of a host. An operating method of a storage device according to this example embodiment may include operations performed in a time-series manner in the storage device 100 of FIG. 1. The description made with reference to FIGS. 1 to 8 may apply to this example embodiment.

In operation S110, the storage device 100 may periodically monitor a status of the PLP capacitor 112. In operation S120, the storage device 100 may manage a performance list according to the status of the PLP capacitor 112. In operation S130, the storage device 100 may receive, from the host 200, a first command for requesting the performance list. In operation S140, the storage device 100 may transmit the performance list to the host 200 in response to the first command.

In operation S150, the storage device 100 may receive, from the host 200, a second command for setting a performance level for at least one function. In operation S160, the storage device 100 may set a performance level for at least one function by adjusting internal resources in response to the second command. For example, the host 200 may generate a second command for setting a performance level and/or a reliability for each tenant, and the storage device 100 may set a performance level and/or a reliability of a function corresponding to a specific tenant in response to the second command. When a performance level for at least one function is set according to the second command and a sum of performance levels for a plurality of functions exceeds a level supportable by the PLP capacitor 112, the storage device 100 may transmit an error message to the host 200. When operation S160 ends, operation S110 may be performed.

FIG. 10 is a flowchart illustrating an operating method of a storage device, according to an example embodiment.

Referring to FIG. 10, an operating method of a storage device according to this example embodiment may correspond to a modified example of the operating method of FIG. 9 and may further include operations S170 and S180 compared to the operating method of FIG. 9. The description made with reference to FIG. 9 may apply to this example embodiment. In operation S170, the storage device 100 may receive, from the host 200, a third command for requesting a performance level for at least one function, set in the storage device 100. In operation S180, the storage device 100 may transmit the performance level set for the at least one function to the host 200. When operation S180 ends, the storage device 100 may periodically monitor the status of the PLP capacitor 112 again (operation S110).

Figure 11:
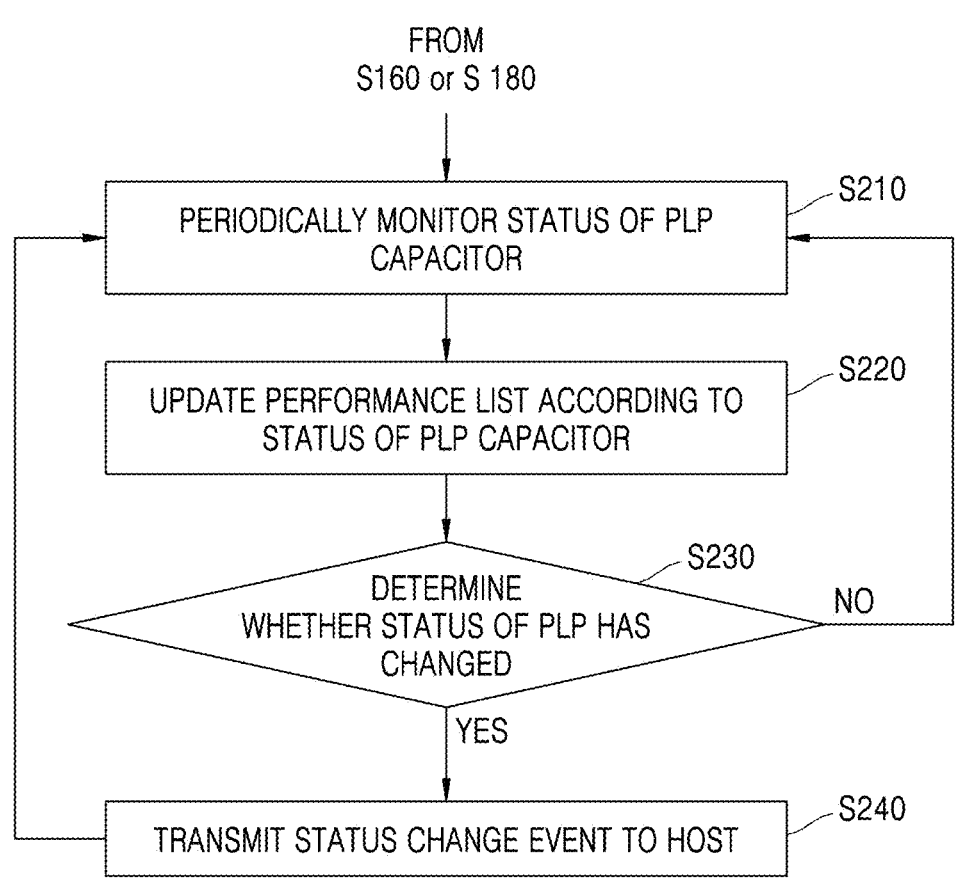

FIG. 11 is a flowchart illustrating an operating method of a storage device, according to an example embodiment.

Referring to FIG. 11, an operating method of a storage device according to this example embodiment may correspond to an operating method of a storage device when a status of a PLP capacitor changes. An operating method of a storage device according to this example embodiment may include operations performed in a time-series manner in the storage device 100 of FIG. 1. The description made with reference to FIGS. 1 to 8 may apply to this example embodiment.

In operation S210, the storage device 100 may periodically monitor a status of the PLP capacitor 112. For example, operation S210 may be performed after operation S160 of FIG. 9. For example, operation S210 may be performed after operation S160 or S180 of FIG. 10. In operation S220, the storage device 100 may update a performance list according to the status of the PLP capacitor 112. For example, the storage device 100 may update the performance list PL1 of FIG. 4A to the performance list PL2 of FIG. 4B.

In operation S230, the storage device 100 may determine whether the status of the PLP capacitor 112 has changed. When it is determined that the status of the PLP capacitor 112 has changed, in operation S240, the storage device 100 may transmit, to the host 200, a status change event indicating that the status of the PLP capacitor 112 has changed. When it is determined that the status of the PLP capacitor 112 has not changed, in operation S210, the storage device 100 may continue to periodically monitor the status of the PLP capacitor 112.

FIG. 12 is a flowchart illustrating an operating method of a host, according to an example embodiment.

Referring to FIG. 12, an operating method according to this example embodiment may correspond to a method by which a host controls various functions of a storage device based on a monitoring result generated in the storage device according to a status of a PLP capacitor included in the storage device. For example, an operating method according to this example embodiment may include operations performed in a time-series manner in the host 200 of FIG. 1. The description made with reference to FIGS. 1 to 8 may apply to this example embodiment.

In operation S310, the host 200 may transmit, to the storage device 100, a first command for requesting a performance list stored in the storage device 100. In operation S320, the host 200 may receive the performance list from the storage device 100. In operation S330, the host 200 may set a performance level for at least one function from among a plurality of functions based on the performance list. For example, the host 200 may determine a performance level for each function by considering the priority or importance of the plurality of functions. For example, the host 200 may determine a performance level for each function according to characteristics of tenants or users corresponding to the plurality of functions, respectively. For example, the host 200 may determine a performance level and/or a reliability for each user or tenant. In this case, the host 200 may determine a performance level for each function so that a sum of performance levels for the plurality of functions does not exceed a level supportable by the storage device 100. In operation S340, the host 200 may transmit, to the storage device 100, a second command including the performance level for the at least one function.

Figure 13:
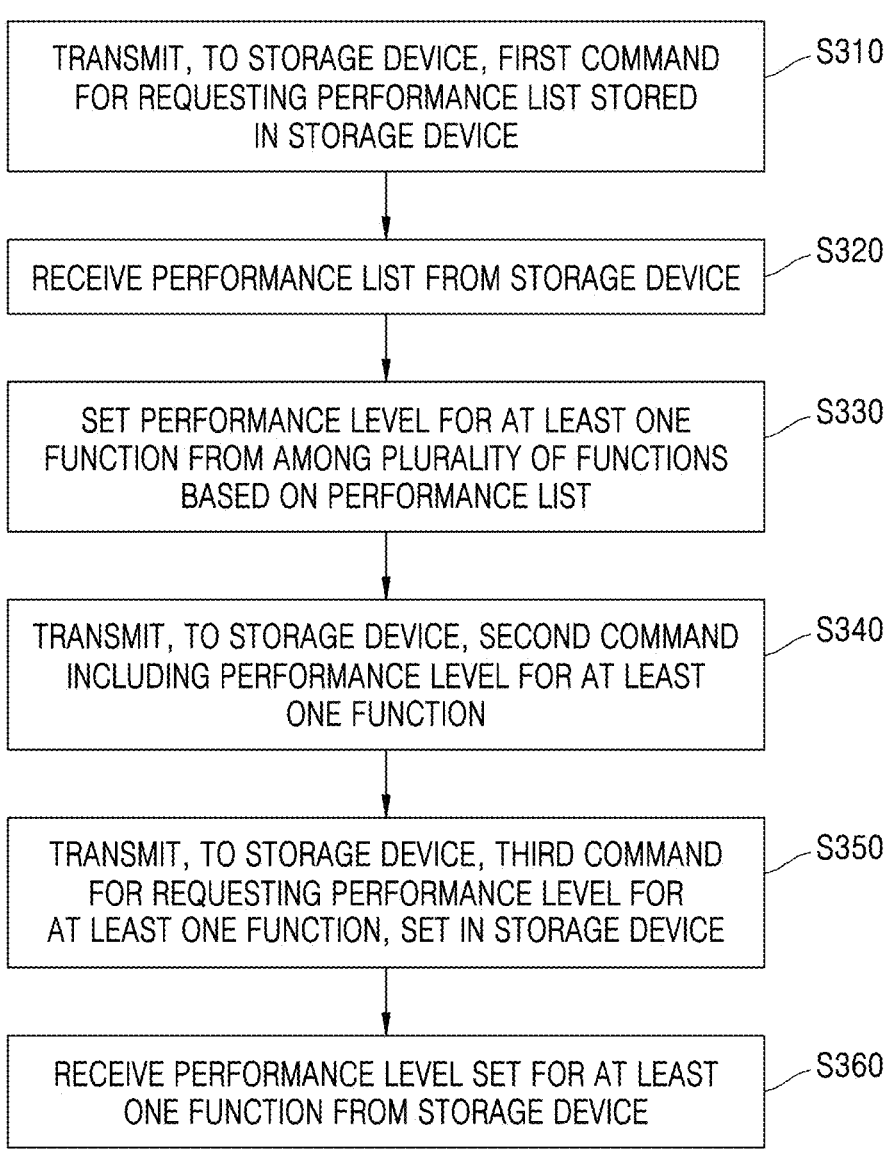

FIG. 13 is a flowchart illustrating an operating method of a host, according to an example embodiment.

Referring to FIG. 13, an operating method of a host according to this example embodiment may correspond to a modified example of the operating method of FIG. 12 and may further include operations S350 and S360 compared to the operating method of FIG. 12. The description made with reference to FIG. 12 may apply to this example embodiment. In operation S350, the host 200 may transmit, to the storage device 100, a third command for requesting the performance level for the at least one function, set in the storage device 100. In operation S360, the host 200 may receive the performance level set for the at least one function from the storage device 100.

Figure 14:
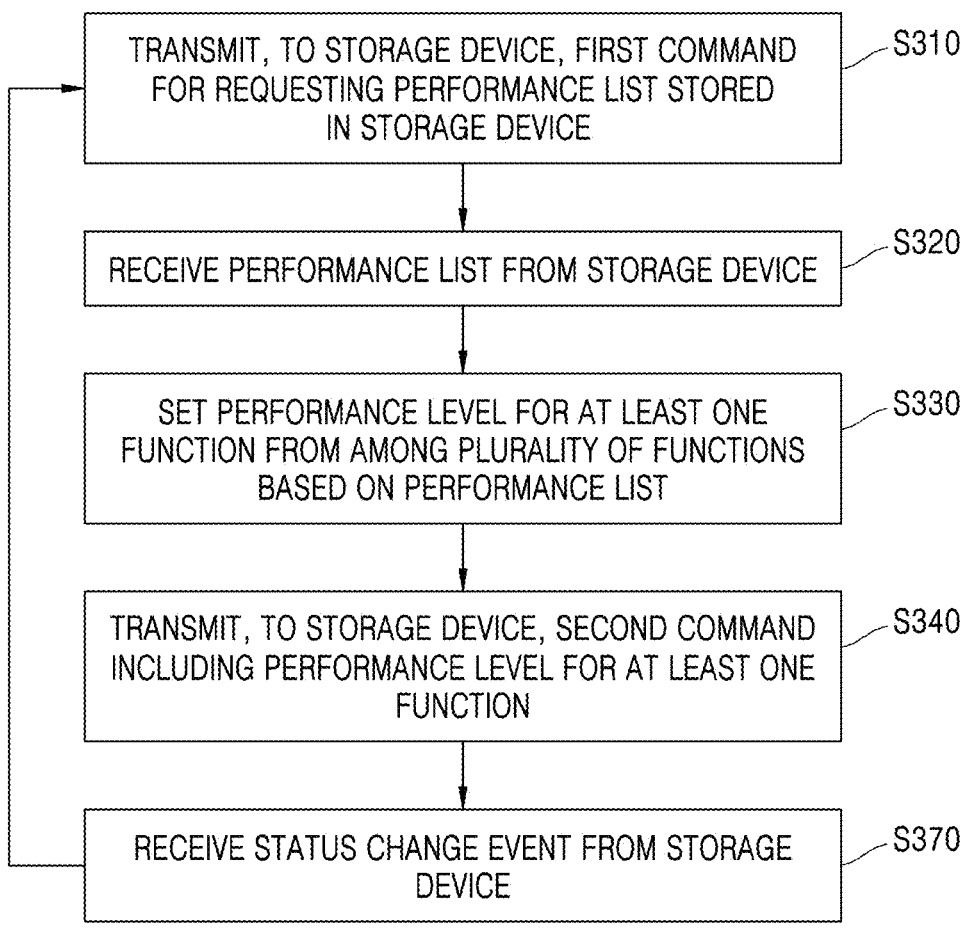

FIG. 14 is a flowchart illustrating an operating method of a host, according to an example embodiment.

Referring to FIG. 14, an operating method of a host according to this example embodiment may correspond to a modified example of the operating method of FIG. 12 and may further include operation S370 compared to the operating method of FIG. 12. The description made with reference to FIG. 12 may apply to the present example embodiment. In operation S370, the host 200 may receive a status change event from the storage device 100. For example, the status change event may be an event indicating a change in a status of the PLP capacitor 112. For example, the status change event may be an event indicating a change in performance information for each function according to the change in the status of the PLP capacitor 112. For example, the status change event may be an event indicating a change in internal resources for each function according to the change in the status of the PLP capacitor 112.

Figure 15:
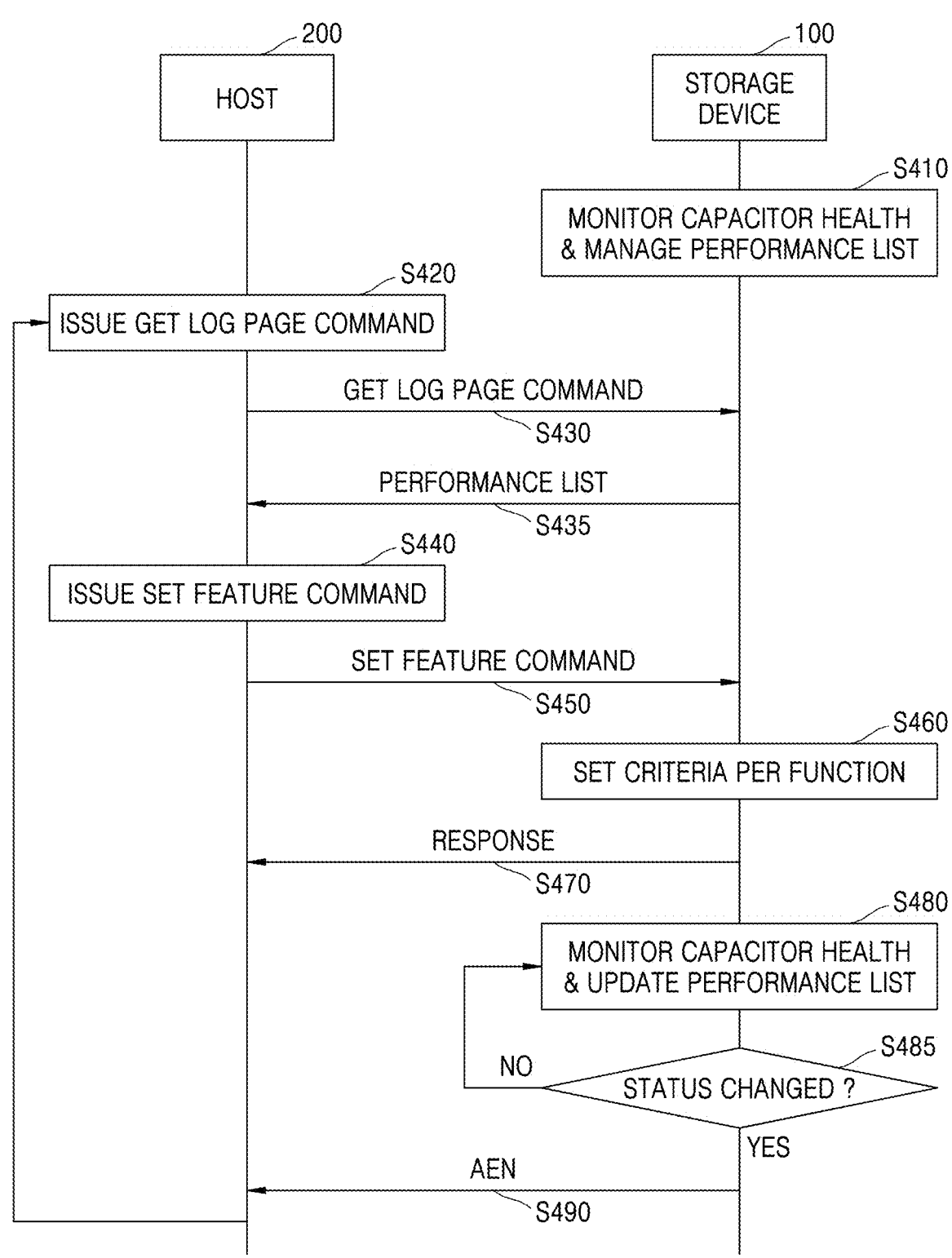
FIG. 15 is a diagram illustrating an operation between a host and a storage device, according to an example embodiment.

FIG. 15 is a diagram illustrating an operation between the host 200 and the storage device 100, according to an example embodiment.

Referring to FIGS. 1 and 15 together, in operation S410, the storage device 100 may monitor capacitor health and may manage a performance list. For example, the storage device 100 may periodically monitor a status of the PLP capacitor 112 through a capacitor health monitoring (CHM) function, and may manage the performance list including pieces of performance information that may be guaranteed or allowed for a plurality of functions according to a monitoring result.

In operation S420, the host 200 may issue a get log page command for requesting the performance list stored in the storage device 100. For example, the get log page command may correspond to the first command of FIG. 12. In operation S430, the host 200 may transmit the get log page command to the storage device 100. In operation S435, the storage device 100 may transmit the performance list to the host 200 in response to the get log page command.

In operation S440, the host 200 may issue a set features command for setting a performance level for each function. For example, the set features command may correspond to the second command of FIG. 12. For example, the host 200 may issue a set features command for setting a performance level and/or a reliability for each tenant. In operation S450, the host 200 may transmit the set features command to the storage device 100. In operation S460, the storage device 100 may set criteria per function, that is, a performance level for each function in response to the set features command. In operation S470, the storage device 100 may transmit, to the host 200, a response message indicating a result of an operation of setting a performance level for each function.

When a performance level for each function is set according to the set features command and a sum of performance levels for the plurality of functions exceeds a level supportable by the PLP capacitor 112, the storage device 100 may transmit an error message to the host 200. Also, when the host 200 requests to set a performance level for a function that may not be supported by the storage device 100 through the set features command, the storage device 100 may transmit an error message to the host 200. For example, in the performance list PL2 of FIG. 4B, when a set features command corresponding to a function corresponding to index 0 or index 1 with a valid bit of 0 is received, the storage device 100 may transmit an error message to the host 200.

In operation S480, the storage device 100 may monitor capacitor health and may update the performance list. For example, the storage device 100 may continue to periodically monitor the status of the PLP capacitor 112 through a CHM function, and may update the performance list by changing performance information, a valid bit, or a PLP data size corresponding to at least one of the plurality of functions according to a monitoring result.

In operation S485, the storage device 100 may determine whether the status of the capacitor has changed. When it is determined that the status of the capacitor has changed, in operation S490, the storage device 100 may transmit an asynchronous event notice (AEN) corresponding to a status change event to the host 200. When it is determined that the status of the capacitor has not changed, operation S480 may be performed.

Figure 16:
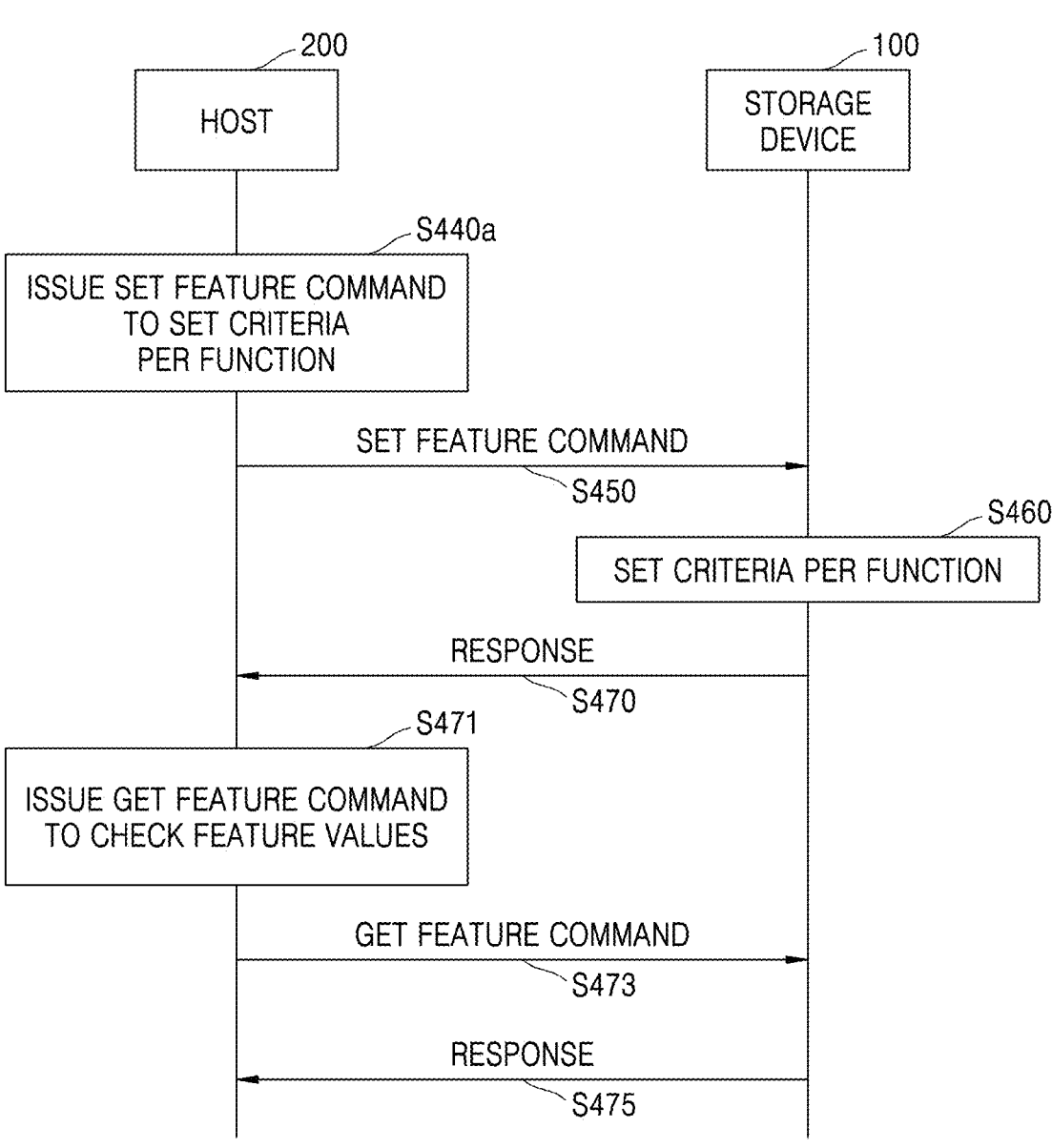
FIG. 16 is a diagram illustrating an operation between a host and a storage device, according to an example embodiment.

FIG. 16 is a diagram illustrating an operation between the host 200 and the storage device 100, according to an example embodiment.

Referring to FIG. 16, an operating method according to this example embodiment may correspond to a modified example of the operating method of FIG. 15. Accordingly, the description made with reference to FIG. 15 may apply to this example embodiment. In operation S440a, the host 200 may issue a set features command for setting criteria per function, that is, a performance level for each function. In operation S450, the host 200 may transmit the set features command to the storage device 100. In operation S460, the storage device 100 may set a performance level for each function in response to the set features command. In operation S470, the storage device 100 may transmit, to the host 200, a response message indicating a result of an operation of setting a performance level for each function.

In operation S471, the host 200 may issue a get features command for checking feature values set in the storage device 100. For example, the get features command may correspond to the third command of FIG. 13. For example, the feature values may correspond to performance levels set for each function. For example, the feature values may correspond to resources for each function. In operation S473, the host 200 may transmit the get features command to the storage device 100. In operation S475, the storage device 100 may transmit, to the host 200, a response message including the feature values requested by the host 200 in response to the get features command.

Figure 17:
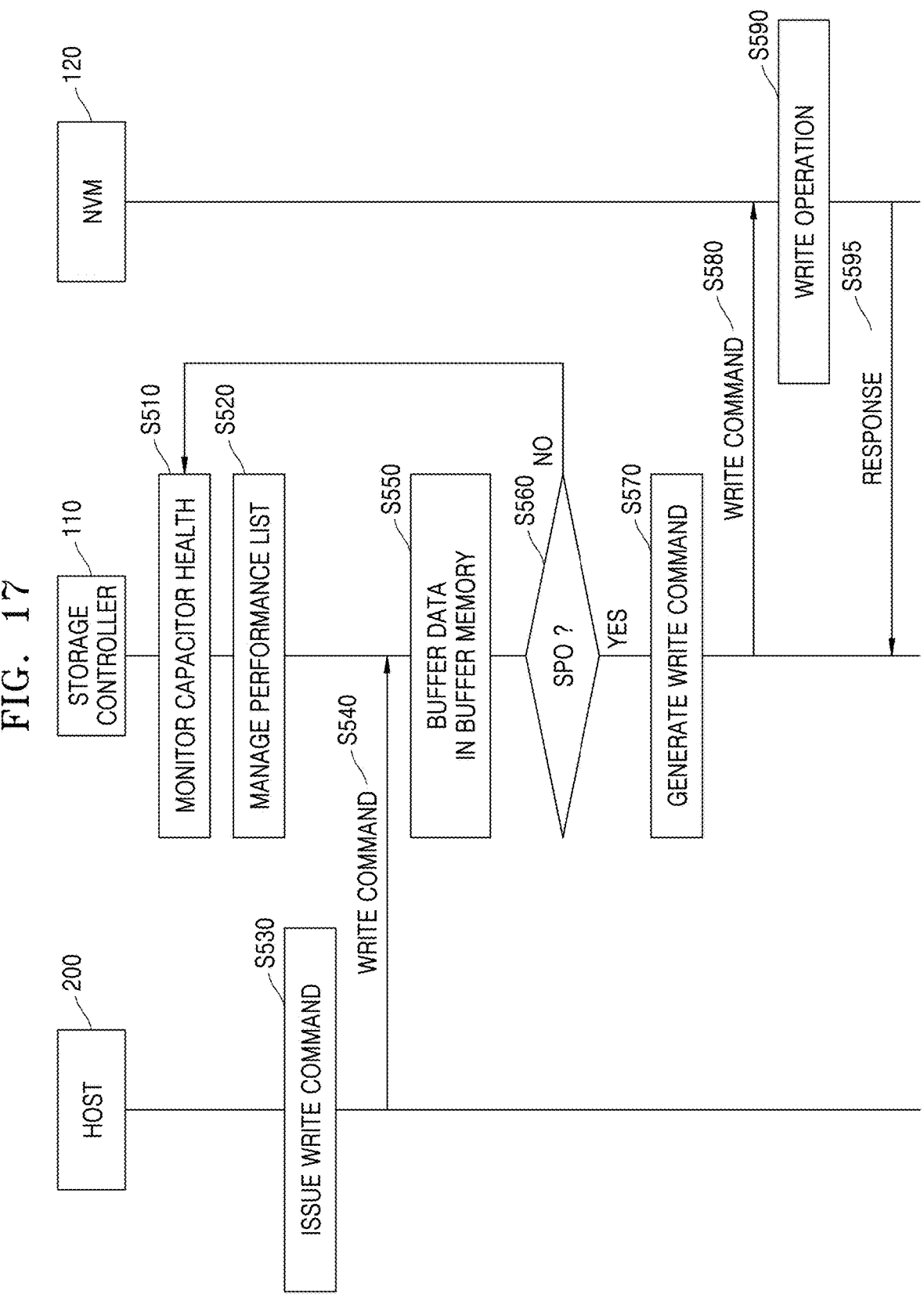
FIG. 17 is a diagram illustrating an operation among a host, a storage controller, and a nonvolatile memory device, according to an example embodiment.

FIG. 17 is a diagram illustrating an operation among the host 200, the storage controller 110, and the NVM 120, according to an example embodiment.

Referring to FIG. 17, in operation S510, the storage controller 110 may periodically monitor capacitor health. In operation S520, the storage controller 110 may manage a performance list based on the capacitor health. In operation S530, the host 200 may issue a write command. In operation S540, the host 200 may transmit write data and the write command to the storage controller 110. In operation S550, the storage controller 110 may buffer the write data in a buffer memory.

In operation S560, the storage controller 110 may determine whether SPO has occurred. When it is determined that SPO has not occurred, operation S510 may be performed. When it is determined that SPO has occurred, in operation S570, the storage controller 110 may generate a write command. In operation S580, the storage controller 110 may transmit the write data and the write command to the NVM 120. In operation S590, the NVM 120 may perform a write operation on the write data. In operation S595, the NVM 120 may transmit a response message including a result of an operation of performing the write operation to the storage controller 110. In this case, operations S570 to S590 may correspond to a flush operation.

Figure 18:
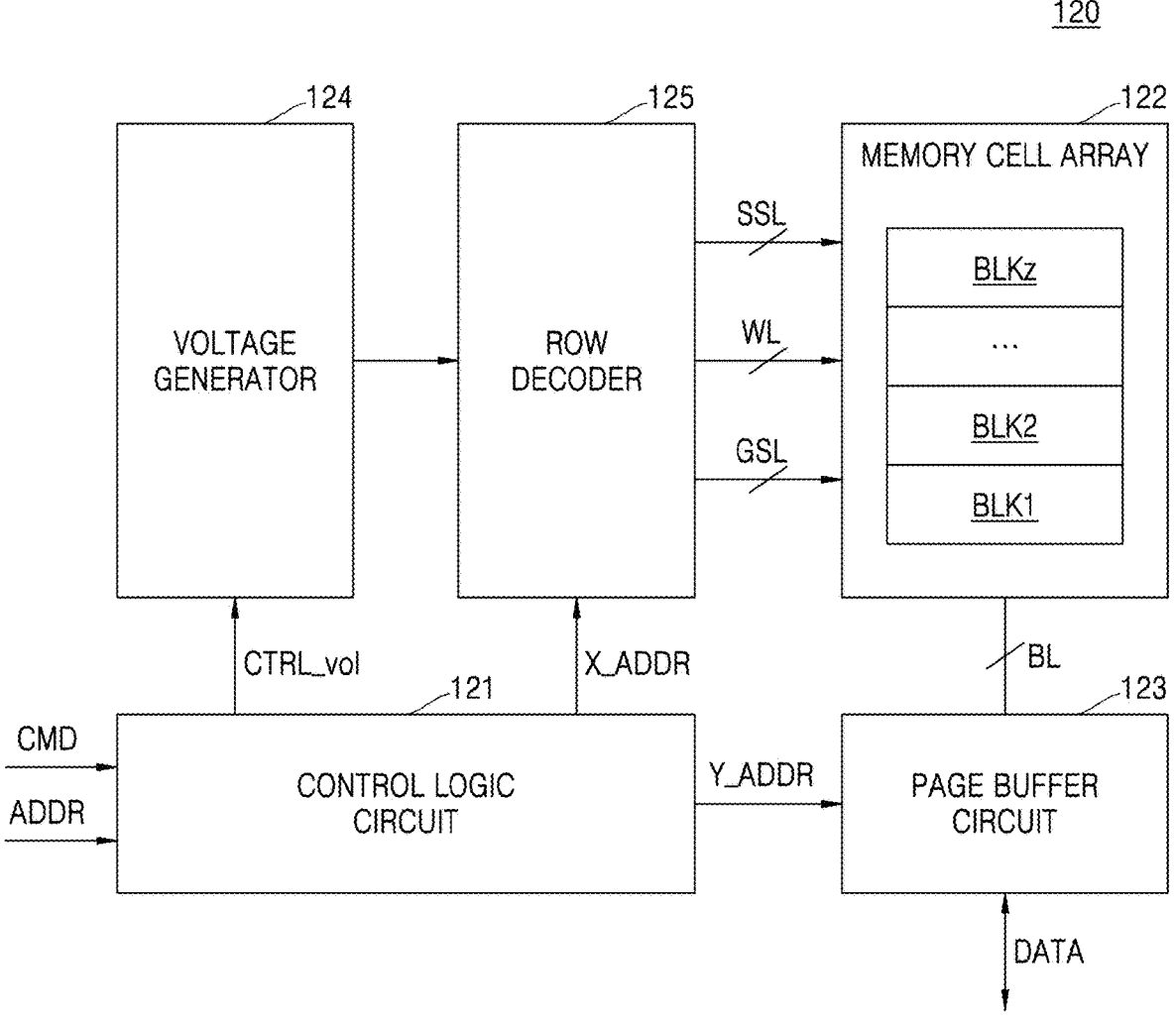
FIG. 18 is a block diagram illustrating a nonvolatile memory, according to an example embodiment.

FIG. 18 is a block diagram illustrating the NVM 120, according to an example embodiment.

Referring to FIG. 18, the NVM 120 may include a control logic circuit 121, a memory cell array 122, a page buffer circuit 123, a voltage generator 124, and a row decoder 125. The NVM 120 may correspond to the NVM 120 of FIG. 1. The memory cell array 122 may include a plurality of memory blocks BLK1 to BLKz, each of the plurality of memory blocks BLK1 to BLKz may include a plurality of cell strings, and each of the plurality of cell strings may include a plurality of memory cells that are connected in series. The memory cell array 122 may be connected to the page buffer circuit 123 through bit lines BL, and may be connected to the row decoder 125 through word lines WL, string selection lines SSL, and ground selection lines GSL.

In an example embodiment, the memory cell array 122 may include a 3D memory cell array, and the 3D memory cell array may include a plurality of cell strings. Each cell string may include memory cells connected to word lines that are vertically stacked on a substrate. U.S. Pat. Nos. 7,679,133, 8,553,466, 8,654,587, 8,559,235, and U.S. Patent Application Publication No. 2011/0233648 are incorporated by reference herein.

In an example embodiment, the memory cell array 122 may include a flash memory, and the flash memory may include a 2D NAND memory array or a 3D vertical NAND (VNAND) memory array. In an example embodiment, the memory cell array 122 may include any of a magnetic RAM (MRAM), a spin-transfer torque MRAM, a conductive bridging RAM (CBRAM), a ferroelectric RAM (FeRAM), a phase RAM (PRAM), a resistive RAM, and various other types of memories.

The control logic circuit 121 may generally control various operations in the NVM 120. The control logic circuit 121 may output various control signals in response to a command CMD and/or an address ADDR. For example, the control logic circuit 121 may output a voltage control signal CTRL_vol, a row address X_ADDR, and a column address Y_ADDR. According to the present example embodiment, the control logic circuit 121 may control a flush operation according to a PLP data size and/or a flush cycle set for each function.

The voltage generator 124 may generate various types of voltages for performing program, read, and erase operations based on the voltage control signal CTRL_vol. For example, the voltage generator 124 may generate a program voltage, a read voltage, a program verification voltage, and an erase voltage as a word line voltage VWL. The row decoder 125 may select least one of a plurality of word lines WL and may select one of a plurality of string selection lines SSL in response to the row address X_ADDR. For example, during a program operation, the row decoder 125 may apply the word line voltages VWL to selected word lines during a search operation or a read operation. The page buffer circuit 123 may select at least one bit line from among the bit lines BL in response to the column address Y_ADDR. The page buffer circuit 123 may operate as a write driver or a sense amplifier according to an operation mode.

Figure 19:
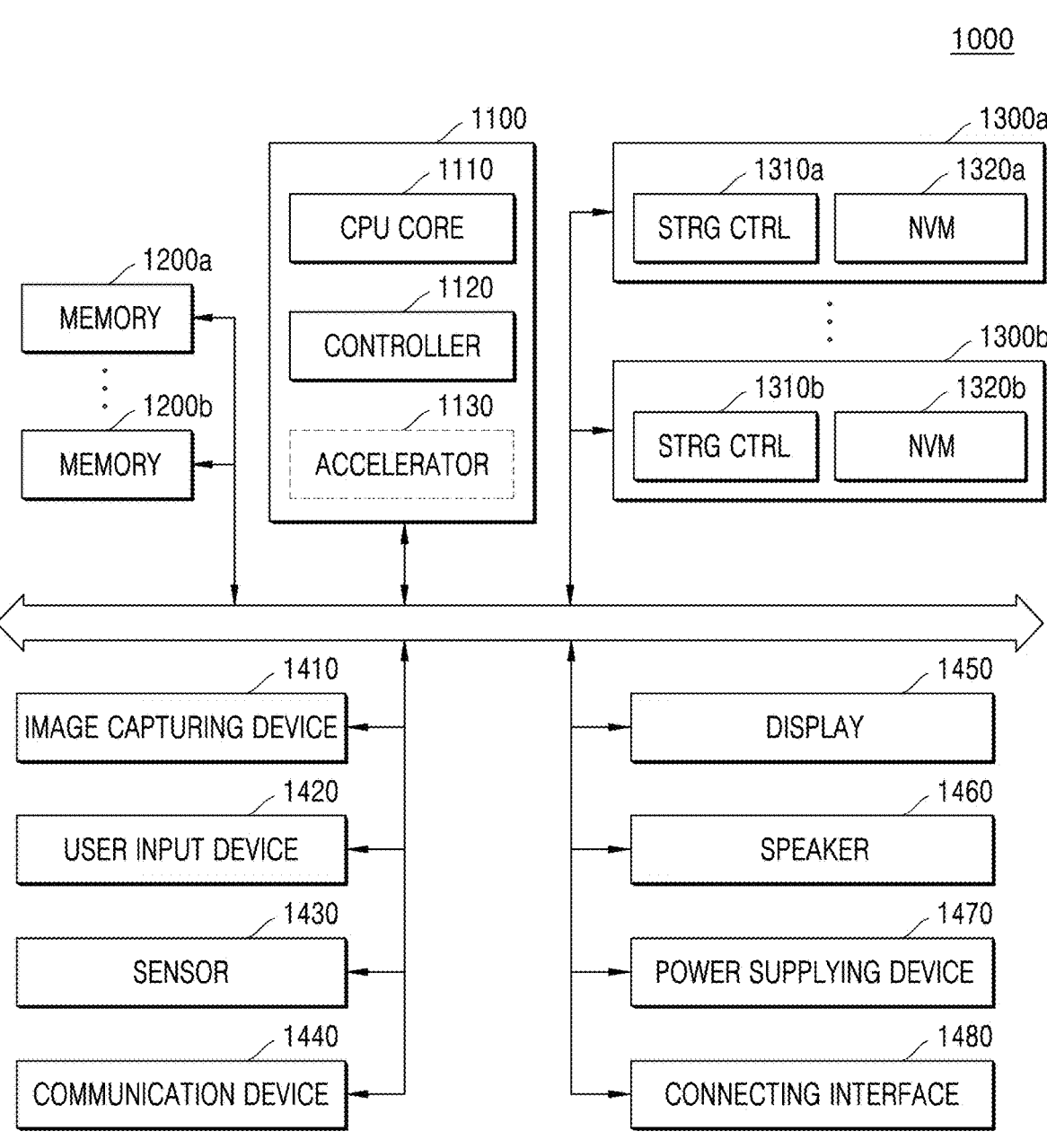
FIG. 19 is a diagram illustrating a system to which a storage device is applied, according to an example embodiment.

FIG. 19 is a diagram illustrating a system 1000 to which a storage device is applied, according to an example embodiment.

The system 1000 of FIG. 19 may be a mobile system such as a mobile phone, a smartphone, a tablet personal computer (PC), a wearable device, a healthcare device, or an Internet of things (IOT) device. However, the system 1000 of FIG. 19 is not necessarily limited to the mobile system, and may be a personal computer, a laptop computer, a server, a media player, or an automotive device such as a navigation device.

Referring to FIG. 19, the system 1000 may include a main processor 1100, memories 1200a and 1200b, and storage devices 1300a and 1300b, and may additionally include at least one of an image capturing device 1410, a user input device 1420, a sensor 1430, a communication device 1440, a display 1450, a speaker 1460, a power supplying device 1470, or a connecting interface 1480.

The main processor 1100 may control an overall operation of the system 1000, more particularly, operations of other elements constituting the system 1000. The main processor 1100 may be implemented as a general-purpose processor, a dedicated processor, or an application processor.

The main processor 1100 may include at least one CPU core 1110, and may further include a controller 1120 for controlling the memories 1200a and 1200b and/or the storage devices 1300a and 1300b. According to some example embodiments, the main processor 1100 may further include an accelerator 1130 that is a dedicated circuit for high-speed data computation such as artificial intelligence (AI) data computation. The accelerator 1130 may include a graphics processing unit (GPU), a neural processing unit (NPU), and/or a data processing unit (DPU), and may be implemented as a separate chip physically independent of other elements of the main processor 1100.

The memories 1200a and 1200b may each be used as a main memory device of the system 1000, and may include a volatile memory such as an SRAM and/or a DRAM but may also include an NVM such as a flash memory, a PRAM, and/or an RRAM. The memories 1200a and 1200b may be implemented in the same package as the main processor 1100.

The storage devices 1300a and 1300b may each function as a nonvolatile storage device in which data is stored regardless of whether power is supplied, and may have a larger storage capacity than the memories 1200a and 1200b. The storage devices 1300a and 1300b may include storage controllers 1310a and 1310b, and NVMs 1320a and 1320b that store data under the control of the storage controllers 1310a and 1310b. The NVMs 1320a and 1320b may include a flash memory having a 2D structure or a 3D vertical NAND (V-NAND) structure, but may include other types of NVMs such as a PRAM and/or an RRAM.

The storage devices 1300a and 1300b may be included in the system 1000 while being physically separated from the main processor 1100, or may be implemented in the same package as the main processor 1100. Also, because the storage devices 1300a and 1300b are of a type such as an SSD or a memory card, the storage devices 1300a and 1300b may be detachably coupled to other elements of the system 1000 through an interface such as the connecting interface 1480 described below. The storage devices 1300a and 1300b may be devices to which a standard protocol such as, but not limited to, universal flash storage (UFS), embedded multimedia card (eMMC), or non-volatile memory express (NVMe) is applied. The example embodiments described with reference to FIGS. 1 to 18 may be implemented in the storage devices 1300a and 1300b.

The image capturing device 1410 may capture a still image or a moving image, and may be a camera, a camcorder, and/or a webcam. The user input device 1420 may receive various types of data input from a user of the system 1000, and may be a touch pad, a keypad, a keyboard, a mouse, and/or a microphone. The sensor 1430 may detect various types of physical quantities that may be obtained from the outside and may convert the detected physical quantities into electrical signals. The sensor 1430 may be a temperature sensor, a pressure sensor, an illuminance sensor, a position sensor, an acceleration sensor, a biosensor, and/or a gyroscope sensor.

The communication device 1440 may transmit and receive signals to and from other devices outside the system 1000 according to various communication protocols. The communication device 1440 may include an antenna, a transceiver, and/or a modem. The display 1450 and the speaker 1460 may function as output devices that output visual information and auditory information, respectively, to the user of the system 1000. The power supplying device 1470 may appropriately convert power supplied from a battery (not shown) included in the system 1000 and/or an external power supply source and may supply the power to each element of the system 1000.

The connecting interface 1480 may provide a connection between the system 1000 and an external device connected to the system 1000 to transmit and receive data to and from the system 1000. The connecting interface 1480 may be implemented in any of various interface methods such as advanced technology attachment (ATA), serial ATA (SATA), external SATA (e-SATA), small computer system interface (SCSI), serial attached SCSI (SAS), peripheral component interconnection (PCI), PCI express (PCIe), NVMe, IEEE 1394, universal serial bus (USB), secure digital (SD) card, multi-media card (MMC), eMMC, UFS, embedded universal flash storage (eUFS), or compact flash (CF) card interface.

Figure 20:
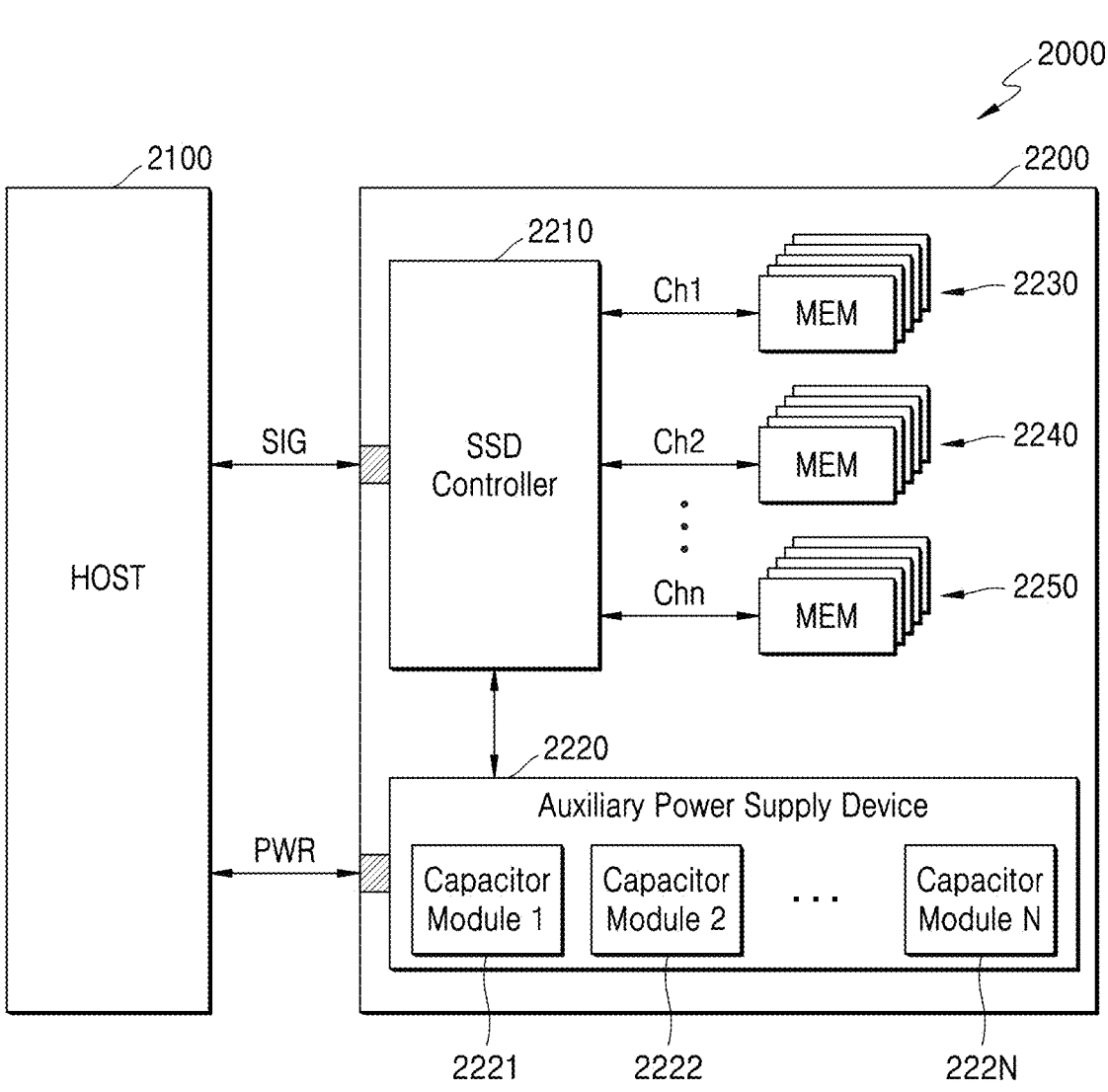
FIG. 20 is a block diagram illustrating a solid-state drive (SSD) system, according to an example embodiment.

FIG. 20 is a block diagram illustrating an SSD system 2000, according to an example embodiment.

Referring to FIG. 20, the SSD system 2000 may include a host 2100 and an SSD 2200. The SSD 2200 may transmit and receive a signal to and from the host 2100 through a signal connector and receives power through a power connector. The SSD 2200 may include an SSD controller 2210, an auxiliary power supply device 2220, and memory devices 2230, 2240, and 2250. The memory devices 2230, 2240, and 2250 may be vertically stacked NAND flash memory devices. The example embodiments described with reference to FIGS. 1 to 18 may be implemented in the SSD 2200.

The auxiliary power supply device 2220 may include a PLP capacitor of FIGS. 1, 2, and 7. In an example embodiment, the auxiliary power supply device 2220 may include first to N$^{th}$ capacitor modules 2221 to 222N. When SPO in which power PWR supplied from the host to the SSD 2200 is suddenly turned off occurs, the auxiliary power supply device 2220 may continuously perform an operation being performed by the SSD 2200 through capacitors stored in the first to N$^{th}$ capacitor modules 2221 to 222N to allow the operation to be completed. Accordingly, the auxiliary power supply device 2220 may prevent data to be stored in the SSD 2200 from being lost when SPO occurs.

Figure 21:
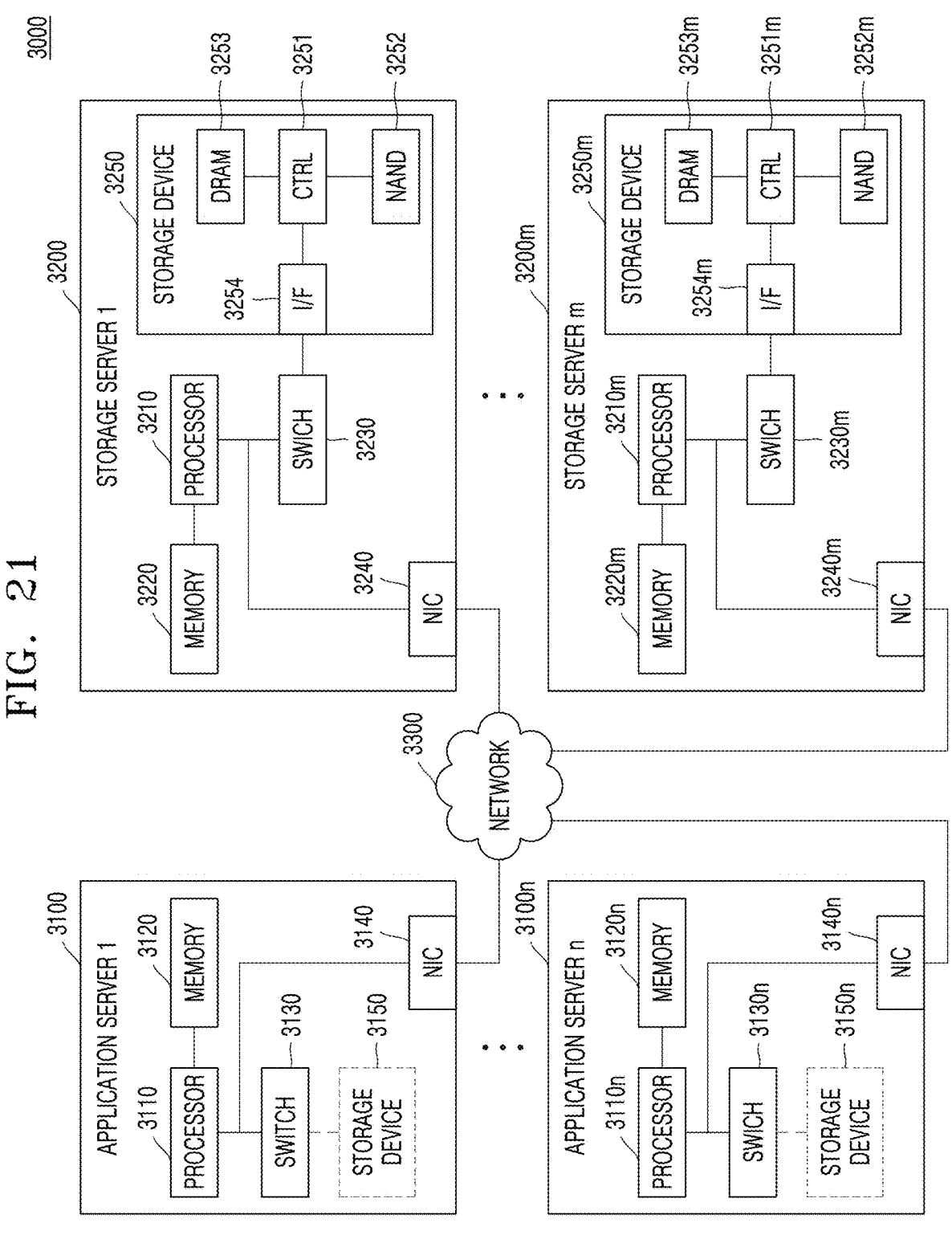
FIG. 21 is a diagram illustrating a data center to which a storage device is applied, according to an example embodiment.

FIG. 21 is a diagram illustrating a data center 3000 to which a storage device is applied, according to an example embodiment.

Referring to FIG. 21, the data center 3000 is a facility that collects various data and provides services, and may be referred to as a data storage center. The data center 3000 may be a system for operating a search engine and a database, and may be a computing system used in a company such as a bank or a government agency. The data center 3000 may include application servers 3100 to 3100n and storage servers 3200 to 3200m. The number of application servers 3100 to 3100n and the number of storage servers 3200 to 3200m may be selected in various ways according to some example embodiments, and the number of application servers 3100 to 3100n and the number of storage servers 3200 to 3200m may be different from each other.

The application server 3100 or the storage server 3200 may include at least one of processors 3110 and 3210 and memories 3120 and 3220. When the storage server 3200 is described as an example, the processor 3210 may control an overall operation of the storage server 3200, and may access the memory 3220 and may execute instructions and/or data loaded into the memory 3220. The memory 3220 may be a DDR double data rate synchronous DRAM (SDRAM), a high bandwidth memory (HBM), a hybrid memory cube (HMC), a dual in-line memory module (DIMM), an optane DIMM, and/or a non-volatile DIMM (NVMDIMM). According to some example embodiments, the number of processors 3210 and the number of memories 3220 included in the storage server 3200 may be selected in various ways. In an example embodiment, the processor 3210 and the memory 3220 may provide a processor-memory pair. In an example embodiment, the number of processors 3210 and the number of memories 3220 may be different from each other. The processor 3210 may include a single-core processor or a multi-core processor. The description of the storage server 3200 may apply to the application server 3100. According to some example embodiments, the application server 3100 may not include a storage device 3150. The storage server 3200 may include at least one storage device 3250. The number of storage devices 3250 included in the storage server 3200 may be selected in various ways according to some example embodiments. The example embodiments described with reference to FIGS. 1 to 18 may be implemented in the application server 3100 or the storage server 3200.

Any functional blocks shown in the figures and described above may be implemented in processing circuitry such as hardware including logic circuits, a hardware/software combination such as a processor executing software, or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Some example embodiments have been described with reference to the drawings and the specification. While some example embodiments have been described by using specific terms, the terms have merely been used to explain the technical ideas of the inventive concepts and should not be construed as limiting the scope of the inventive concepts defined by the claims.

While this inventive concepts have been particularly shown and described with reference to some example embodiments thereof, it will be understood by one of ordinary skill in the art that various changes in form and details may be made therein without departing from the spirit and scope of the inventive concepts.

What is claimed is:

1. A storage device comprising:
    a multi-function controller configured to control a plurality of functions requested from a host, wherein the plurality of functions comprises a physical function supporting one or more dependent virtual functions;

a power loss protection (PLP) capacitor configured to supply auxiliary power to the storage device; and a PLP controller configured to periodically monitor a status of the PLP capacitor, and manage a performance list including pieces of performance information supportable for the plurality of functions according to the status of the PLP capacitor, wherein managing the performance list comprises updating the pieces of performance information supportable for the plurality of functions according to a change in the status of the PLP capacitor, wherein the PLP controller is further configured to provide the performance list to the host in response to a first command received from the host, and set a performance level for at least one function from among the plurality of functions by adjusting internal resources of the storage device, in response to a second command received from the host, wherein the internal resources comprise at least one of a PLP data size, or a flush cycle in which write data is flushed from a buffer memory to a nonvolatile memory.

2. The storage device of claim 1, wherein the PLP controller is further configured to increase the internal resources in response to the second command, when first performance information corresponding to the at least one function is equal to or greater than a reference value, and reduce the internal resources in response to the second command, when the first performance information corresponding to the at least one function is less than the reference value.

3. The storage device of claim 1, wherein the PLP controller comprises:

a capacitor monitor configured to periodically monitor the status of the PLP capacitor; and a performance manager configured to manage the performance list according to the status of the PLP capacitor.

4. The storage device of claim 1, further comprising:

a host interface configured to receive, from the host, the first command for requesting the performance list, transmit the performance list to the host in response to the first command, and receive, from the host, the second command for setting the performance level for the at least one function.

5. The storage device of claim 4, wherein the host interface is further configured to receive the write data from the host, and the storage device further comprises, the buffer memory configured to buffer the write data, and the nonvolatile memory configured to store the write data buffered in the buffer memory.

6. The storage device of claim 5, wherein the PLP controller is further configured to determine the PLP data size allowed by PLP for each of the plurality of functions, and update performance information corresponding to each of the plurality of functions, based on the PLP data size, and the PLP data size corresponds to a size of data flushed from the buffer memory to the nonvolatile memory.

7. The storage device of claim 6, wherein, when sudden power-off (SPO) occurs, the storage device is configured to store the write data corresponding to the PLP data size and buffered in the buffer memory, in the nonvolatile memory.

8. The storage device of claim 4, wherein the host interface is further configured to receive, from the host, a third command for checking the performance level for the at least one function, and transmit the performance level to the host in response to the third command.

9. The storage device of claim 4, wherein the PLP controller is further configured to, when the status of the PLP capacitor changes, update the performance list based on a changed status of the PLP capacitor, and the host interface is further configured to transmit, to the host, a status change event indicating that the status of the PLP capacitor has changed.

10. The storage device of claim 9, wherein the host interface is further configured to receive, from the host, a fourth command for requesting the updated performance list, and transmit the updated performance list to the host in response to the fourth command.

11. The storage device of claim 1, wherein the performance list further includes valid bits corresponding to the plurality of functions, respectively, each of the valid bits indicating whether a corresponding piece of performance information is valid, and the PLP controller is further configured to, when a piece of performance information corresponding to the at least one function included in the second command is not valid, transmit an error message to the host.

12. An operating method of a storage device, the operating method comprising:

periodically monitoring a status of a power loss protection (PLP) capacitor included in the storage device;

managing a performance list including pieces of performance information supportable for a plurality of functions according to the status of the PLP capacitor, wherein the plurality of functions comprises a physical function supporting one or more dependent virtual functions, and managing the performance list comprises updating the pieces of performance information supportable for the plurality of functions according to a change in the status of the PLP capacitor;

receiving, from a host, a first command for requesting the performance list;

transmitting the performance list to the host in response to the first command;

receiving, from the host, a second command for setting a performance level for at least one function from among the plurality of functions; and setting the performance level for the at least one function by adjusting internal resources of the storage device, in response to the second command, wherein the internal resources comprise at least one of a PLP data size, or a flush cycle in which write data received from the host is flushed from a buffer memory to a nonvolatile memory.

13. The operating method of claim 12, wherein the managing the performance list comprises determining the PLP data size corresponding to each of the plurality of functions, according to the status of the PLP capacitor, and updating performance information corresponding to each of the plurality of functions, based on the PLP data size, and the PLP data size corresponds to a size of data flushed from the buffer memory to the nonvolatile memory included in the storage device.

14. The operating method of claim 12, further comprising:

when sudden power-off (SPO) occurs, storing the write data corresponding to the PLP data size and buffered in the buffer memory in the nonvolatile memory.

15. The operating method of claim 12, further comprising:

receiving, from the host, a third command for checking the performance level for the at least one function; and transmitting the performance level to the host in response to the third command.

16. The operating method of claim 12, further comprising:

when the status of the PLP capacitor changes, updating the performance list based on a changed status of the PLP capacitor; and transmitting, to the host, a status change event indicating that the status of the PLP capacitor has changed.

17. The operating method of claim 16, further comprising:

receiving, from the host, a fourth command for requesting the updated performance list; and transmitting the updated performance list to the host in response to the fourth command.

18. The operating method of claim 12, wherein the performance list further includes valid bits corresponding to the plurality of functions, respectively, each of the valid bits indicating whether a corresponding piece of performance information is valid, and the operating method further comprises, when a piece of performance information corresponding to the at least one function included in the second command is not valid, transmitting an error message to the host.

19. The operating method of claim 12, further comprising:

increasing the internal resources in response to the second command, when first performance information corresponding to the at least one function is equal to or greater than a reference value; and reducing the internal resources in response to the second command, when the first performance information corresponding to the at least one function is less than the reference value.

20. The operating method of claim 12, further comprising:

determining the PLP data size allowed by PLP for each of the plurality of functions; and updating performance information corresponding to each of the plurality of functions, based on the PLP data size.

\* \* \* \* \*